(12) United States Patent
Zemp et al.

(10) Patent No.: US 12,313,829 B2
(45) Date of Patent: May 27, 2025

(54) FAST SCANNING MICROSCOPE SYSTEMS, AND RELATED OPTICS AND METHODS

(71) Applicant: Roger James Zemp, Edmonton (CA)

(72) Inventors: Roger James Zemp, Edmonton (CA); Brendyn Daniel Cikaluk, Edmonton (CA); Brendon S. Restall, Edmonton (CA); Matthew Thomas Martell, Edmonton (CA); Nathaniel Jeremy Meyer Haven, Edmonton (CA)

(73) Assignee: Roger James Zemp

( * ) Notice: Subject to any disclaimer, the term of this patent is extended or adjusted under 35 U.S.C. 154(b) by 0 days.

(21) Appl. No.: 18/141,819

(22) Filed: May 1, 2023

(65) Prior Publication Data

US 2024/0369817 A1    Nov. 7, 2024

(51) Int. Cl.
*G02B 21/00* (2006.01)
*G01N 21/64* (2006.01)
*G02B 27/10* (2006.01)
*G02B 27/14* (2006.01)

(52) U.S. Cl.
CPC ..... *G02B 21/0036* (2013.01); *G01N 21/6458* (2013.01); *G02B 21/0032* (2013.01); *G02B 21/006* (2013.01); *G02B 21/0072* (2013.01); *G02B 21/0076* (2013.01); *G02B 21/008* (2013.01); *G02B 27/1006* (2013.01); *G02B 27/1066* (2013.01); *G02B 27/141* (2013.01); *G02B 21/0056* (2013.01)

(58) Field of Classification Search
CPC ............ G02B 21/0036; G02B 21/0032; G02B 21/006; G02B 21/0072; G02B 21/0076; G02B 21/008; G02B 21/0056; G02B 27/141; G02B 27/10066; G02B 27/1006; G01N 21/6458
See application file for complete search history.

(56) References Cited

U.S. PATENT DOCUMENTS

| 5,633,711 | A | * | 5/1997 | Nelson | G01B 11/0666 356/318 |
| 6,185,030 | B1 | * | 2/2001 | Overbeck | G02B 21/0076 359/210.1 |
| 2006/0012862 | A1 | * | 1/2006 | Engelmann | G02B 21/0036 359/385 |

(Continued)

OTHER PUBLICATIONS

Huston et al., The influence of additional surgical margins on the total specimen volume excised and the reoperative rate after breast-conserving surgery, The American Journal of Surgery, 2006, pp. 209-512, issue 92, 4 pages.

(Continued)

*Primary Examiner* — Georgia Y Epps
*Assistant Examiner* — Don J Williams
(74) *Attorney, Agent, or Firm* — Robert A. Nissen

(57) ABSTRACT

Fast scanning microscope systems, optics, and methods are discussed. Fast scanning systems may incorporate position feedback systems, focus-sub adjust systems, light sources, controllers, and optics. Multi-wavelength microscope systems are also discussed. Endlessly single mode fibers may be used to carry a variety of light beams to and from a sample. Scanning systems may be used to scan light from the light sources and samples, and a controller may be used to control, adjust parameters, and analyze images and date produced from the system.

18 Claims, 23 Drawing Sheets

(56) References Cited

U.S. PATENT DOCUMENTS

2020/0292803 A1* 9/2020 Harig ............... G02B 21/0032
2023/0228984 A1* 7/2023 Watson ............... G02B 21/26
 348/79

OTHER PUBLICATIONS

McCahill et al., Variability in Reexcision Following Breast Conservation Surgery, Journal of the American Medical Association, 2012, pp. 467-475, vol. 307, No. 5, 9 pages.

J. C. Cendán, et al., "Accuracy of intraoperative frozen-section analysis of breast cancer lumpectomy-bed margins," J. Am. Coll. Surg. 201, 194-198 (2005), 5 pages.

H. Cheng et al., "Prolonged operative duration increases risk of surgical site infections: A systematic review," Surg. Infect. 18, 722-735 (2017). PMID: 28832271, 14 pages.

D. Orringer et al., "Rapid intraoperative histology of unprocessed surgical specimens via fibre-laser-based stimulated raman scattering microscopy," Nat. Biomed. Eng. 1, 0027 (2017), 25 pages.

T. C. Hollon et al., "Near real-time intraoperative brain tumor diagnosis using stimulated raman histology and deep neural networks," Nat. Med. 26, 52-58 (2020), 24 pages.

B. Zhang et al., "Rapid, large-scale stimulated raman histology with strip mosaicing and dual-phase detection," Biomed. Opt. Express 9, 2604-2613 (2018), 10 pages.

L. Cahill et al., "Rapid virtual hematoxylin and eosin histology of breast tissue specimens using a compact fluorescence nonlinear microscope," Lab. Investig. 98 (2017), 11 pages.

Y. K. Tao et al., "Assessment of breast pathologies using nonlinear microscopy," Proc. National Acad. Sci. 111, 15304-15309 (2014), 6 pages.

M. G. Giacomelli et al., "Comparison of nonlinear microscopy and frozen section histology for imaging of mohs surgical margins," Biomed. Opt. Express 10, 4249-4260 (2019), 12 pages.

J. Kang., "Rapid tissue histology using multichannel confocal fluorescence microscopy with focus tracking," Quant. Imaging Med. Surg. 8, 884-893 (2018), 10 pages.

F. Fereidouni et al., "Microscopy with ultraviolet surface excitation for rapid slide-free histology," Nat. Biomed. Eng. 1, 957-966 (2017), 23 pages.

A. K. Glaser et al., "Light-sheet microscopy for slide-free nondestructive pathology of large clinical specimens," Nat. Biomed. Eng. 1 (2017), 22 pages.

P. Hajireza et al., "Non-interferometric photoacoustic remote sensing microscopy," Light. Sci. &; Appl. 6 (2017), 8 pages.

K. L. Bell et al., "Temporal evolution of low-coherence reflectrometry signals in photoacoustic remote sensing microscopy," Appl. optics 56, 5172-5181 (2017), 10 pages.

P. H. Reza et al., "Deep non-contact photoacoustic initial pressure imaging," Optica 5, 814-820 (2018), 7 pages.

K. L. Bell, "Coherence-gated photoacoustic remote sensing microscopy," Opt. express 26, 23689-23704 (2018), 16 pages.

P. Kedarisetti et al., "Label-free lipid contrast imaging using non-contact near-infrared photoacoustic remote sensing microscopy," Opt. Lett. 45, 4559-4562 (2020), 4 pages.

N. J. M. Haven et al., "Ultraviolet photoacoustic remote sensing microscopy," Opt. Lett. 44, 3586-3589 (2019), 4 pages.

N. J. M. Haven et al., "Reflective objective-based ultraviolet photoacoustic remote sensing virtual histopathology," Opt. Lett. 45, 535-538 (2020), 4 pages.

P. Kedarisetti et al., "F-mode ultraviolet photoacoustic remote sensing for label-free virtual h&e histopathology using a single excitation wavelength," Opt. Lett. 46, 3500-3503 (2021), 4 pages.

B. S. Restall et al., "Multimodal 3d photoacoustic remote sensing and confocal fluorescence microscopy imaging," J. Biomed. Opt. 26, 096501 (2021), 12 pages.

B. S. Restall et al., "Virtual hematoxylin and eosin histopathology using simultaneous photoacoustic remote sensing and scattering microscopy," Opt. Express 29, 13864-13875 (2021), 12 pages.

N. J. M. Haven et al., "Virtual histopathology with ultraviolet scattering and photoacoustic remote sensing microscopy," Opt. Lett. 46, 5153-5156 (2021), 4 pages.

B. R. Ecclestone et al., "Label-free complete absorption microscopy using second generation photoacoustic remote sensing," Sci. Reports 12, 1-17 (2022), 17 pages.

M. Boktor et al., "Virtual histological staining of label-free total absorption photoacoustic remote sensing (ta-pars)," Sci. Reports 12, 1-12 (2022), 12 pages.

M. T. Martell et al., "Fiber-based photoacoustic remote sensing microscopy and spectral-domain optical coherence tomography with a dual-function 1050-nm interrogation source," J. Biomed. Opt. 26, 066502 (2021), 10 pages.

Z. Hosseinaee et al., "Functional and structural ophthalmic imaging using noncontact multimodal photoacoustic remote sensing microscopy and optical coherence tomography," Sci. Reports 11, 1-11 (2021), 11 pages.

B. R. Ecclestone et al., "Single acquisition label-free histology-like imaging with dual-contrast photoacoustic remote sensing microscopy," J. Biomed. Opt. 26, 056007 (2021), 12 pages.

B. S. Restall et al., "Fast hybrid optomechanical scanning photoacoustic remote sensing microscopy for virtual histology," Biomed. Opt. Express 13, 39-47 (2022), 9 pages.

A. M. Demarzo et al., "Pathological and molecular aspects of prostate cancer," The Lancet 361, 955-964 (2003), 10 pages.

D. Novis and R. Zarbo, "Interinstitutional comparison of frozen section turnaround time. a college of american pathologists q-probes study of 32868 frozen sections in 700 hospitals," Arch. pathology laboratory medicine 121, 559-67 (1997), 1 page.

Fei Yu et al., "Single-mode solarization-free hollow-core fiber for ultraviolet pulse delivery," Opt. Express 26, 10879-10887 (2018), 9 pages.

R. Hubbard et al., "Wide spectral range confocal microscope based on endlessly single-mode fiber," Opt. Express 18, 18811-18819 (2010), 9 pages.

B. Cikaluk et al., "Rapid ultraviolet photoacoustic remote sensing microscopy using voice-coil stage scanning", Optics Express 2023, vol. 31, No. 6, 14 pages.

* cited by examiner

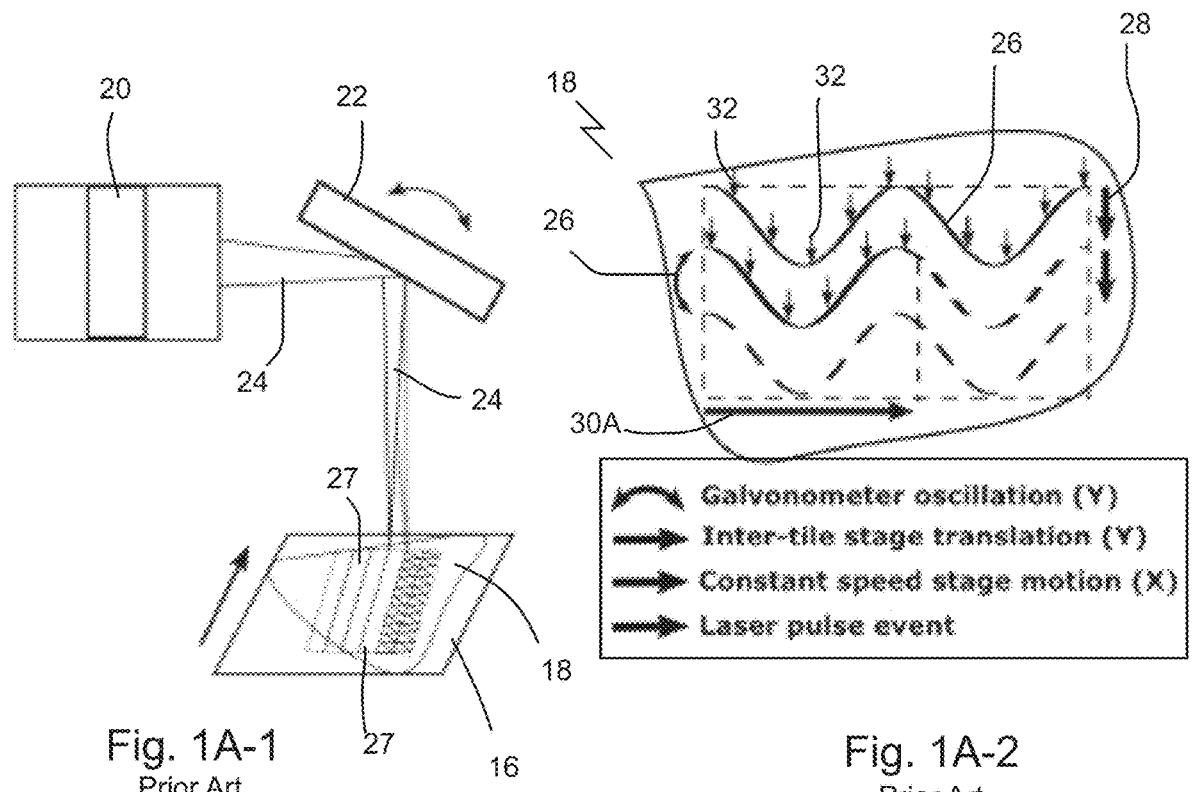
Fig. 1A-1
Prior Art
Fig. 1A-2
Prior Art
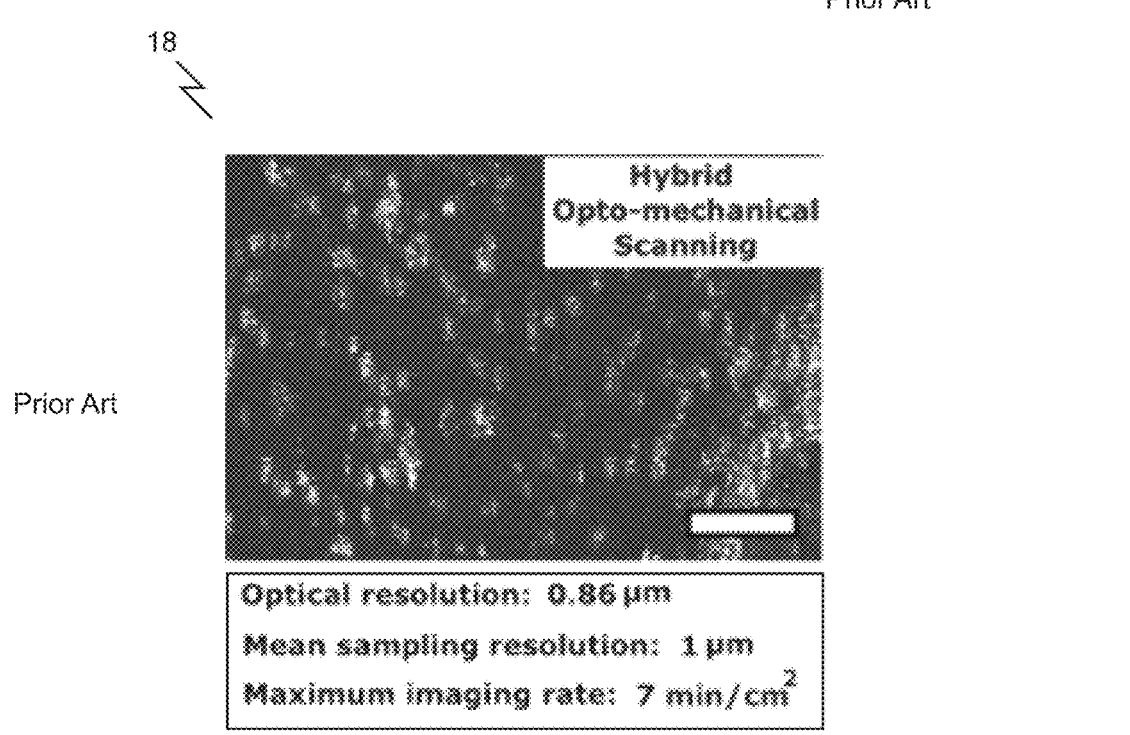
Prior Art
Fig. 1A-3
Prior Art

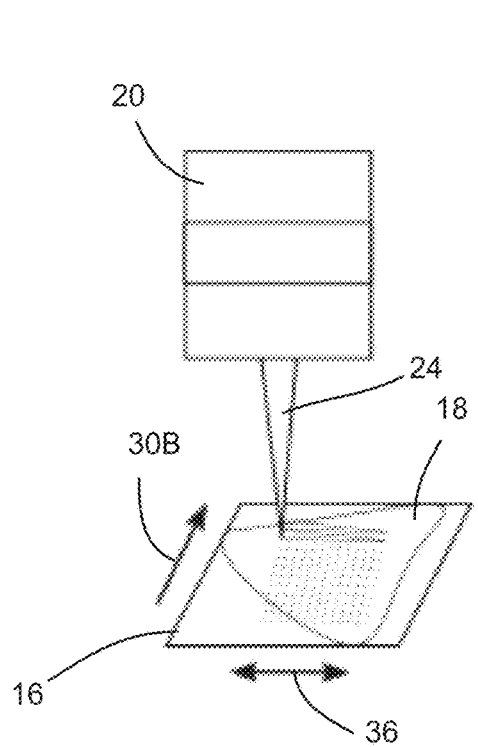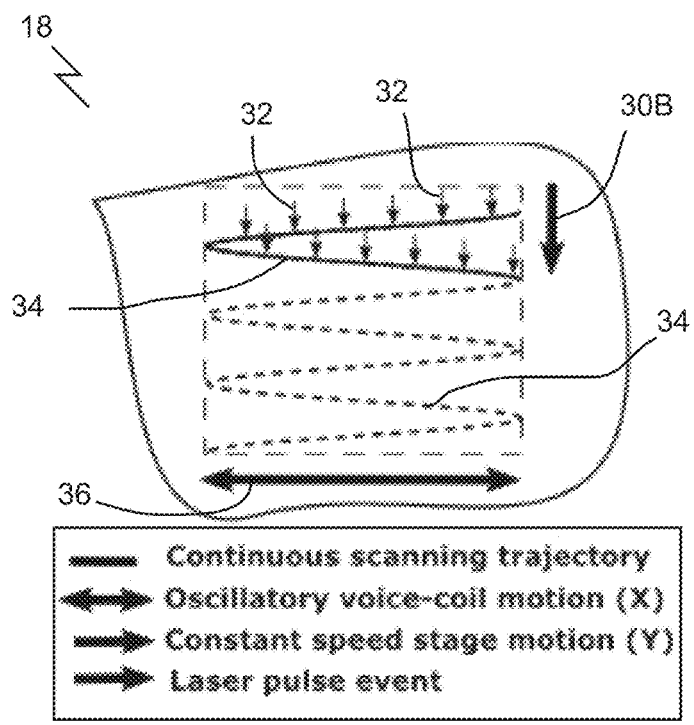
Fig. 1C-1    Fig. 1C-2
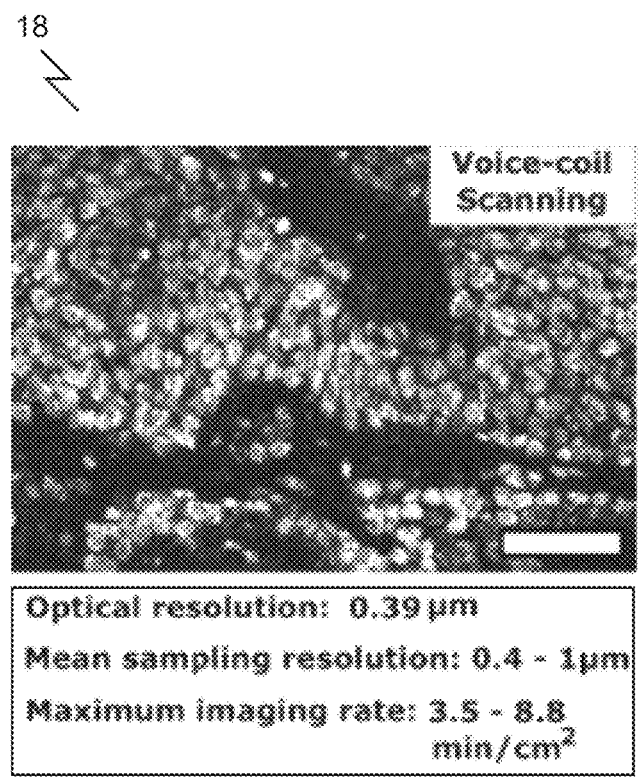
Fig. 1C-3

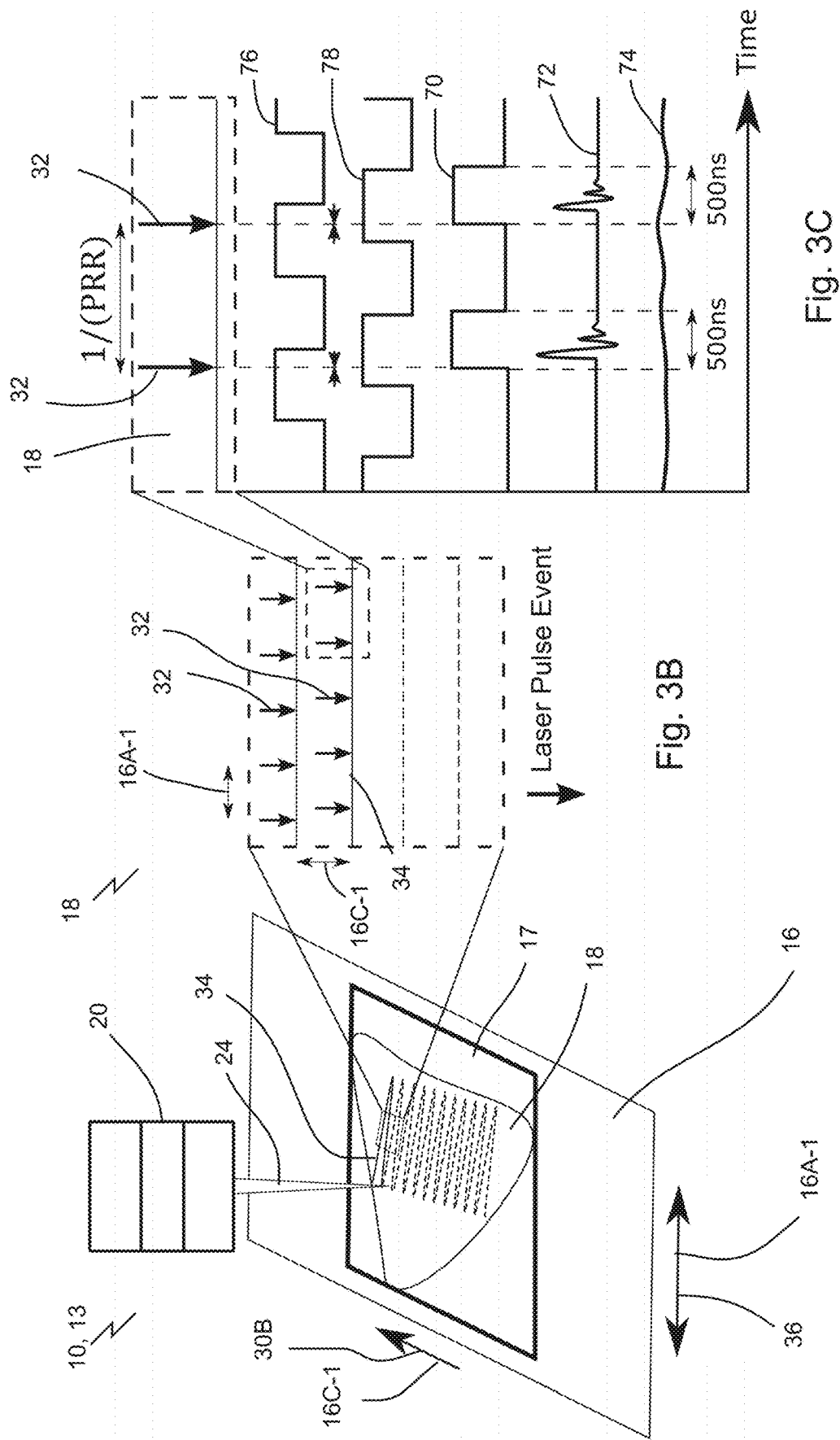

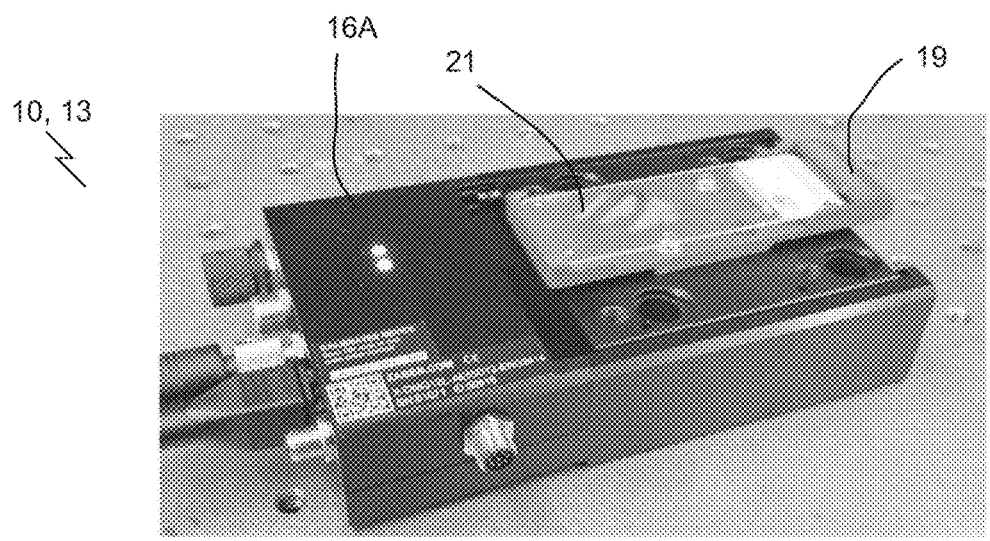
Fig. 4A
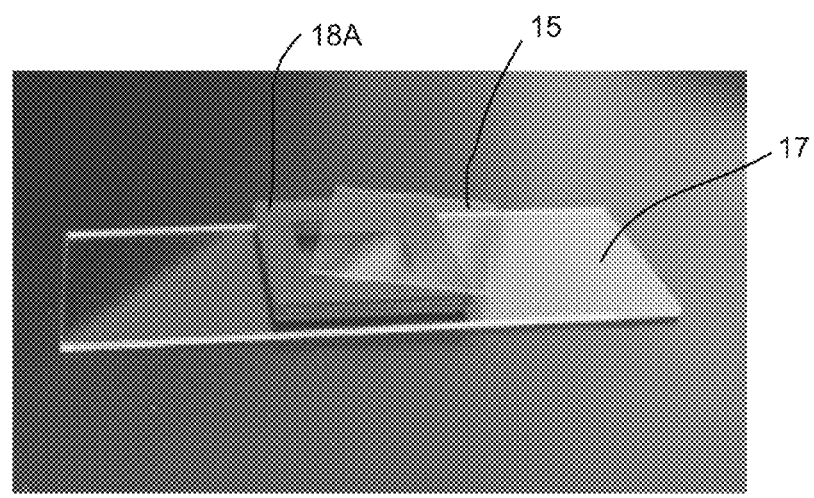
Fig. 4B
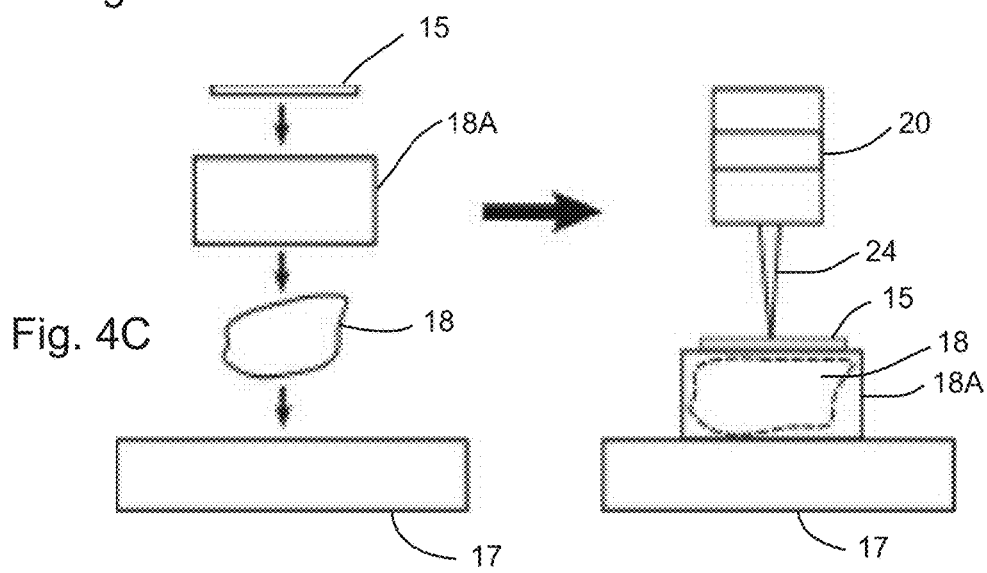
Fig. 4C
Fig. 4D

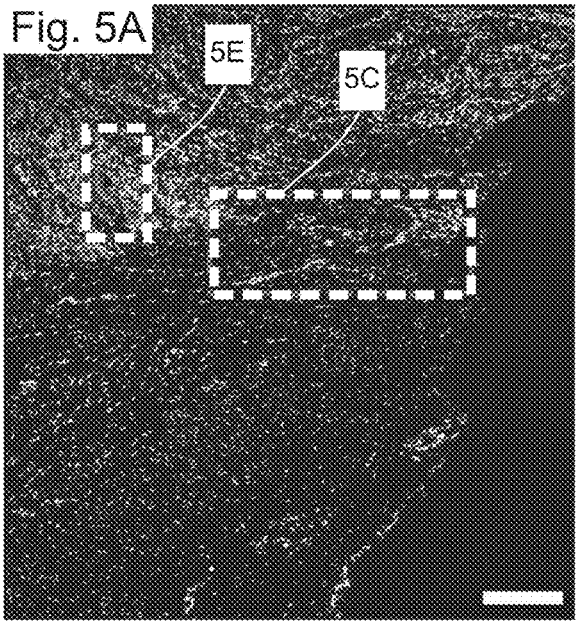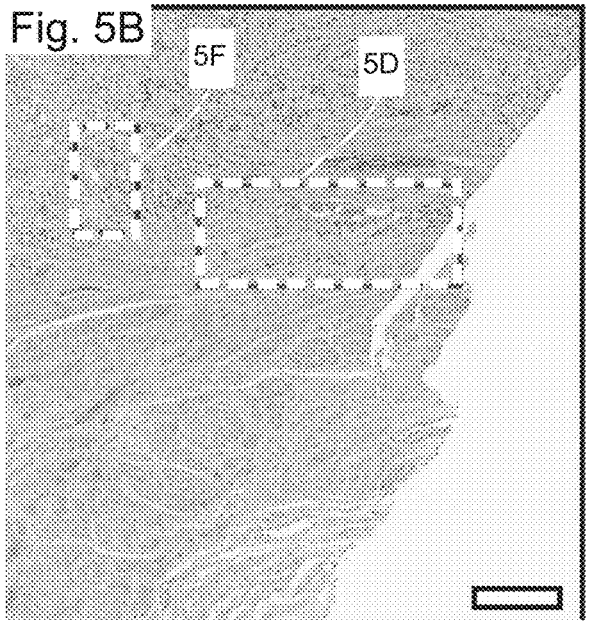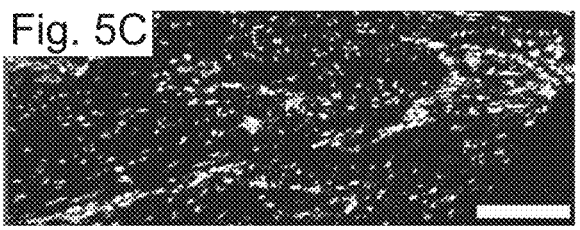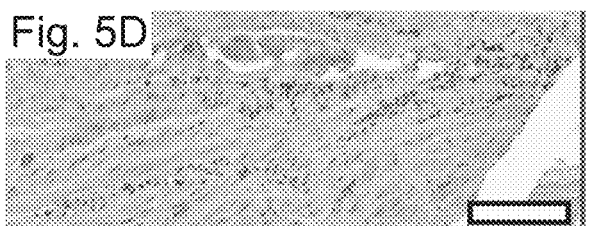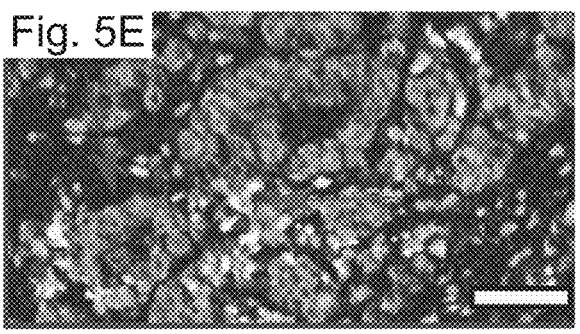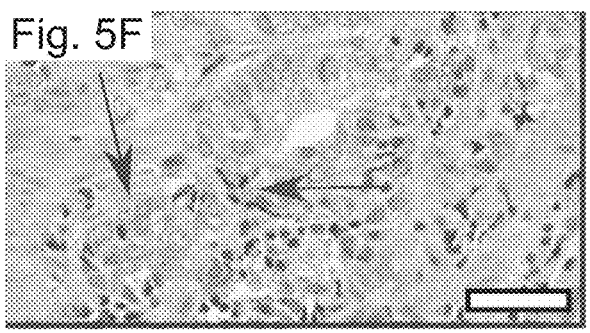

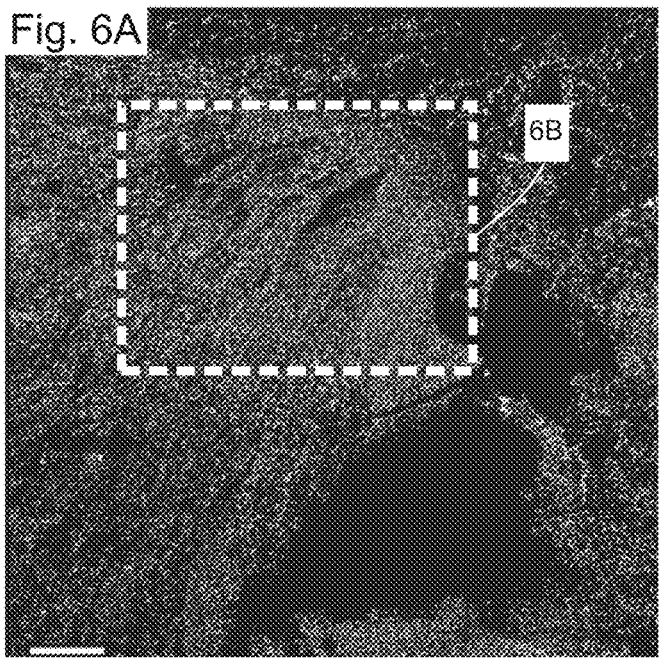
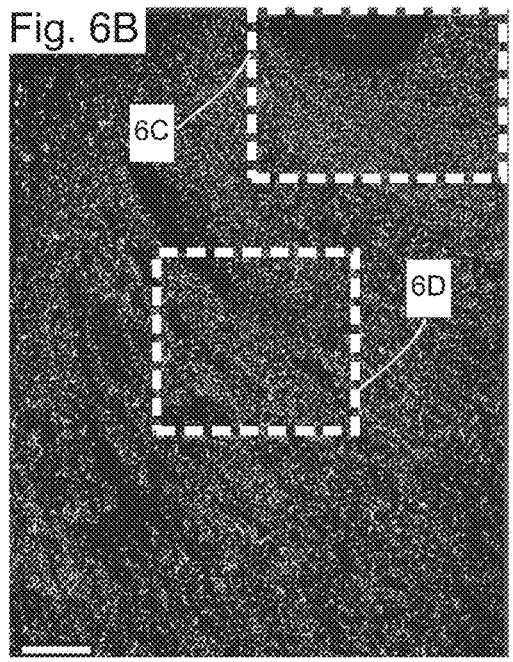
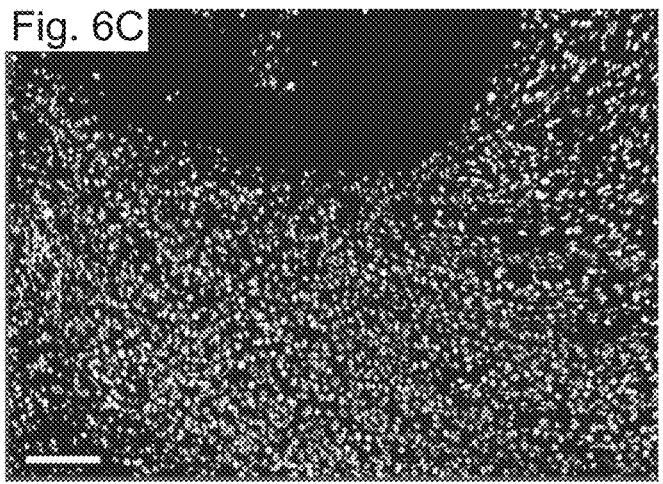
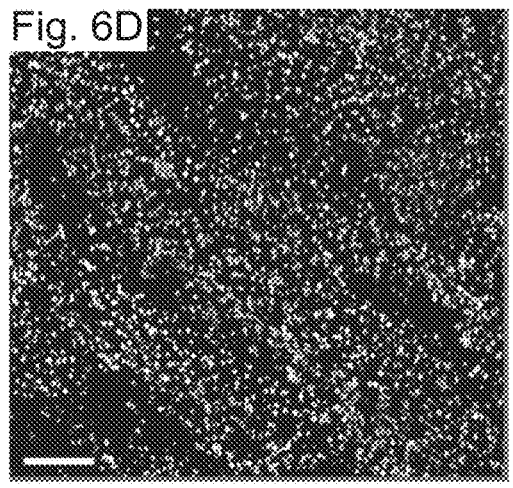

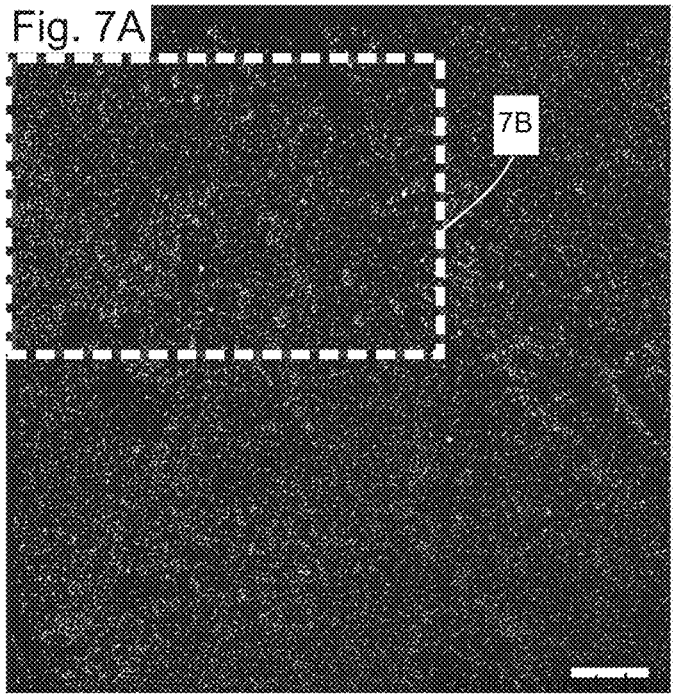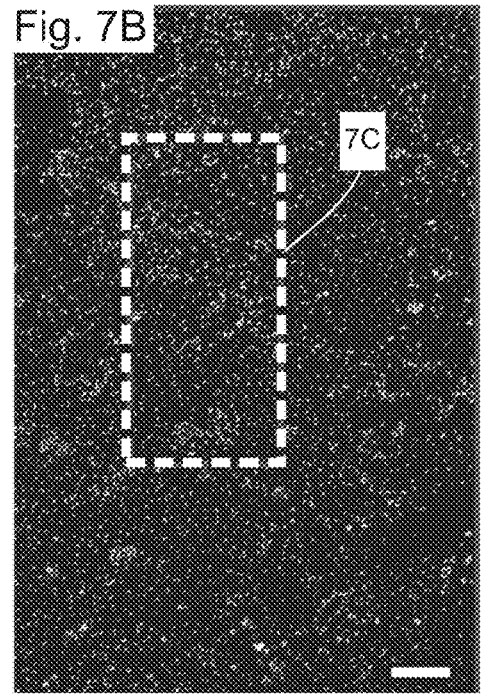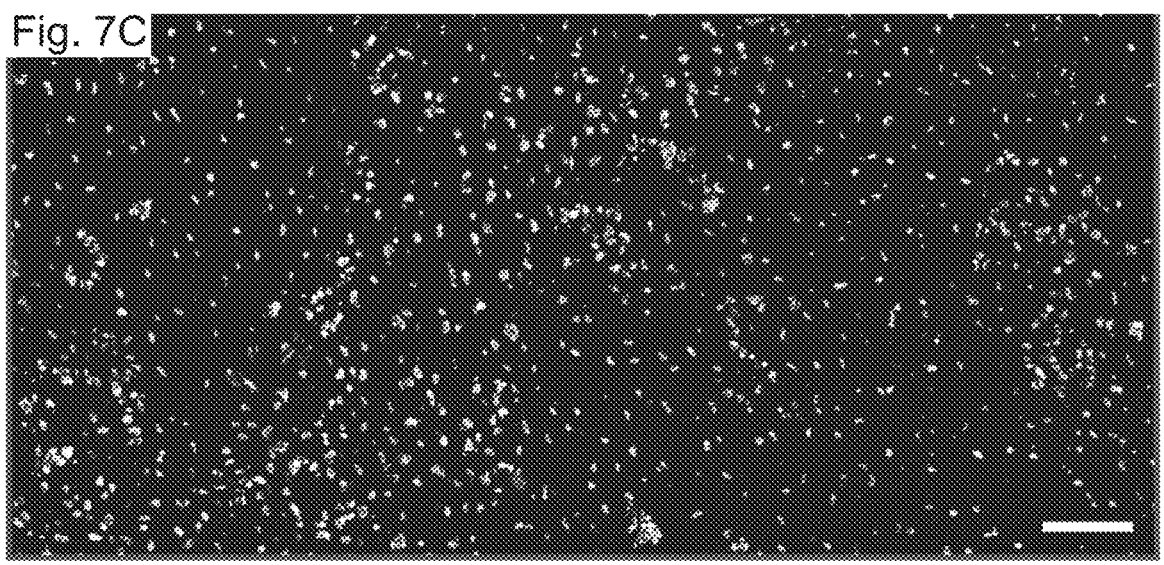

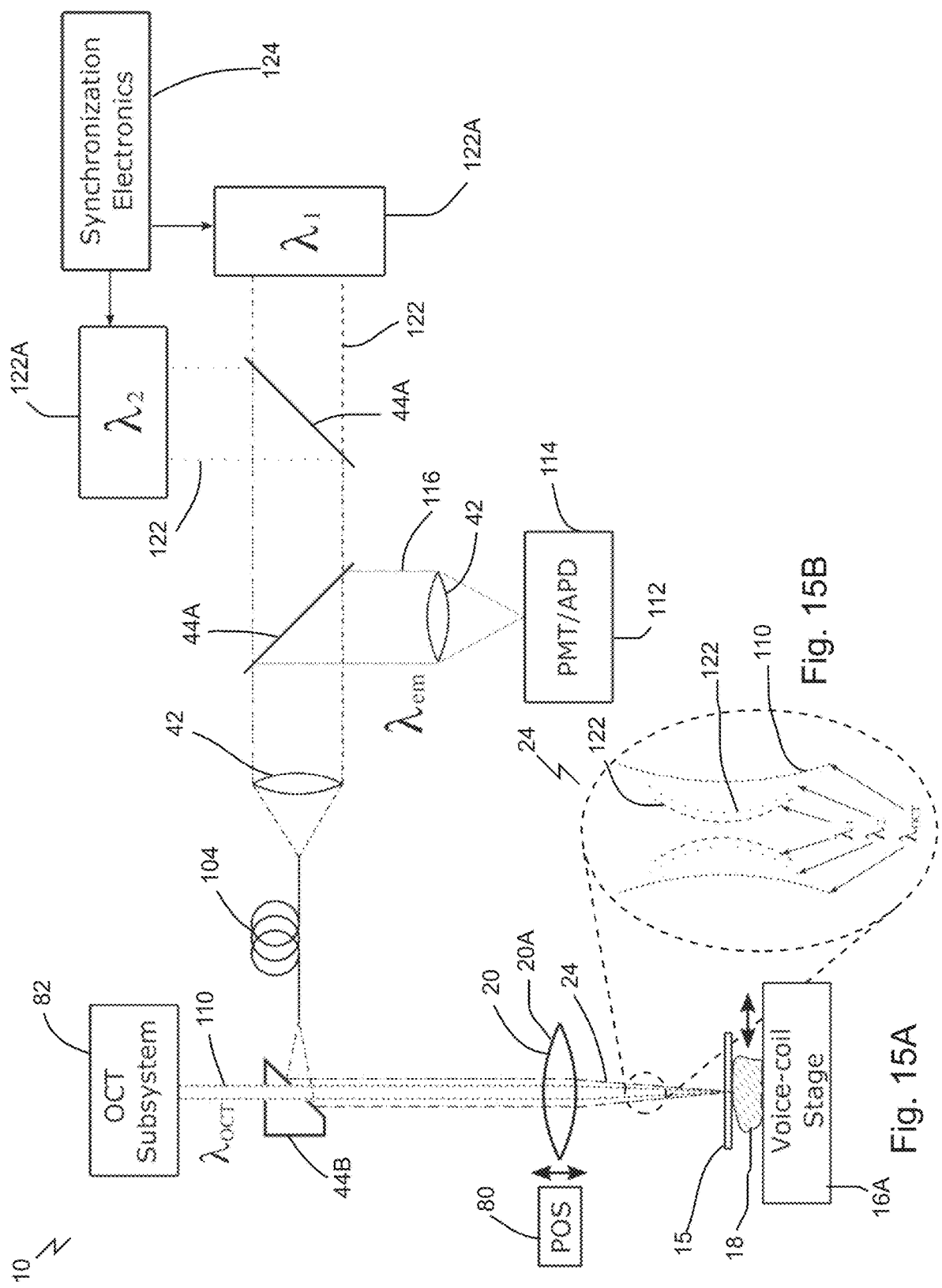

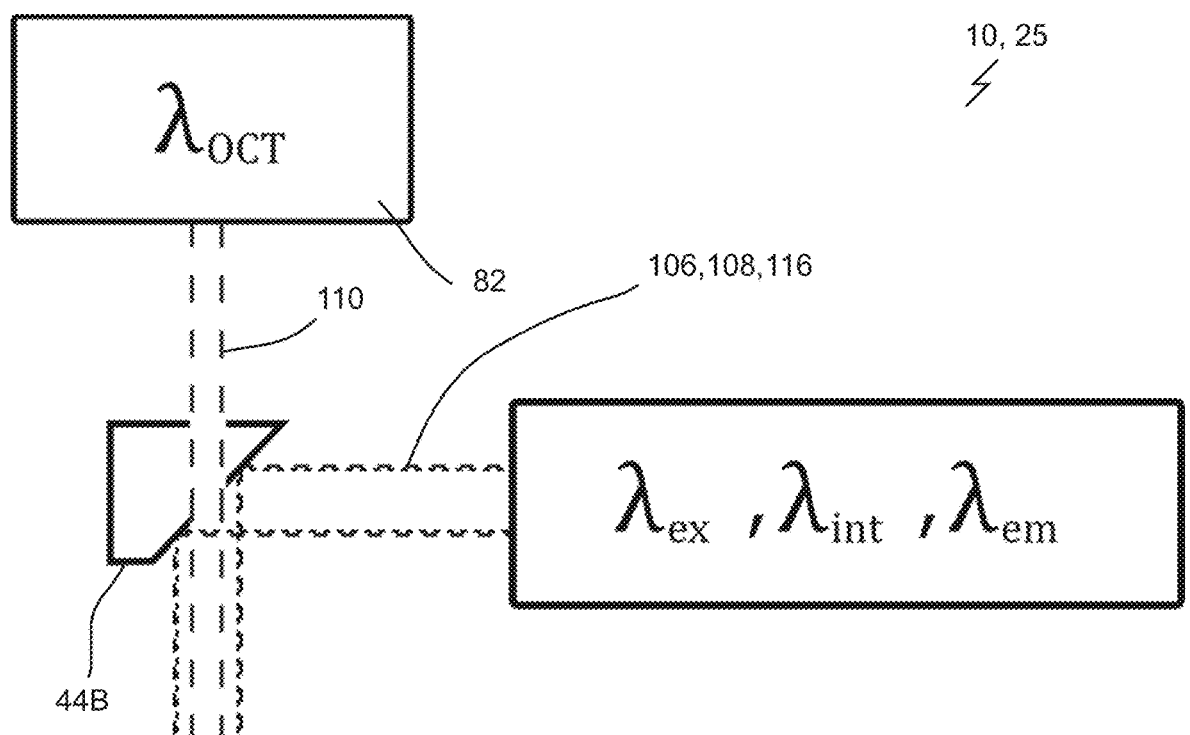
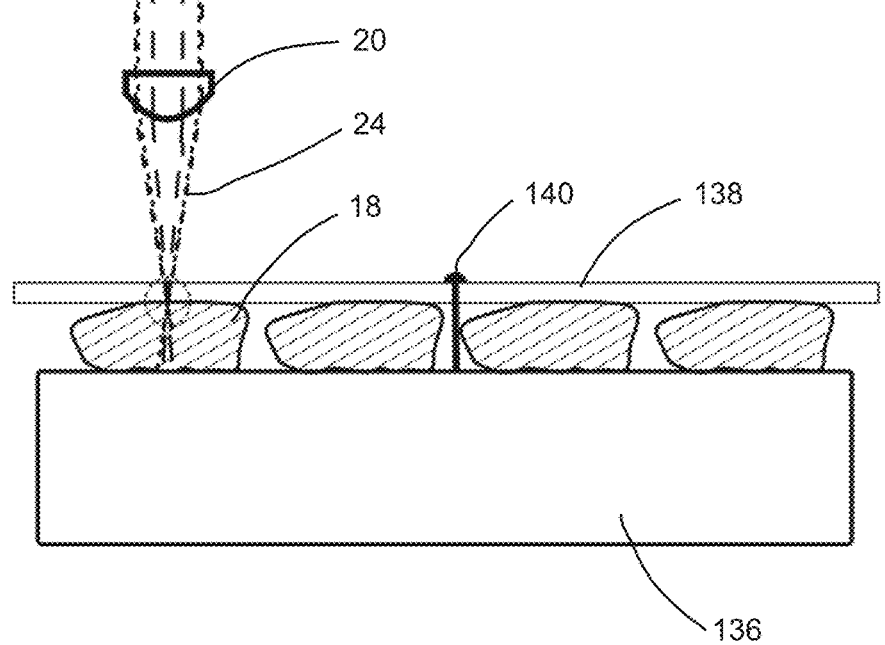
Fig. 19

FAST SCANNING MICROSCOPE SYSTEMS, AND RELATED OPTICS AND METHODS

TECHNICAL FIELD

The document relates to the field of optical imaging, microscopy, and laser-based imaging methods with fields of use including but not limited to biomedical imaging of tissues and live subjects, imaging for non-destructive testing, and semiconductor device inspection.

BACKGROUND

The following paragraphs are not an admission that anything discussed in them is prior art or part of the knowledge of persons skilled in the art.

There is a longstanding tradeoff in optical microscopes regarding resolution and field of view. Point-scanning microscopies sometimes use optical scanning (e.g., with galvanometer mirrors), however, focal quality degrades off axis and diffraction-limited performance is not typically achieved over large fields of view. However, both large fields of view (>cm) and fine diffraction-limited focusing is needed in fields such as histology where resolution as fine as 300 nm is needed to assess intra-nuclear detail for pathologists to make accurate diagnoses. Scanning the sample relative to an on-axis focused beam can achieve diffraction-limited focusing over a large area, however, doing so rapidly, within minutes (sufficient for intra-operative time-frames) and without losing focus on the sample surface is challenging. This is even more challenging when fresh tissue specimens need to be rapidly loaded for imaging with minimal intervention for sample alignment or tip-tilt adjustment. Few motion stages are capable of rapid scanning and maintaining constant stage height during scanning. This problem may be exacerbated by uneven sample height.

Rapid ultraviolet photoacoustic remote sensing microscopy using voice-coil stage scanning. The primary treatment option for solid-tumor cancers is surgical resection, in which surgeons attempt to remove all malignant tissue while retaining as much healthy tissue as possible. Upon removal of the tissue volume, the sample will be inspected for positive surgical margins (PSMs), which is indicative of incomplete resection. The gold-standard histological method for margin analysis is via brightfield imaging of hematoxylin and eosin (H&E) stained formalin-fixed paraffin-embedded (FFPE) tissue sections. However, this process is both laborious and time-consuming, hence necessitating post-operative margin analysis. An estimated 20-40% of patients who undergo breast-conserving surgeries will require re-excision due to the post-operative identification of PSMs, placing additional burden on both the patient and the healthcare system. Frozen section (FS) procedures have also been employed for histopathological margin analysis. FS techniques can report results within 20 minutes, and is thus a viable option for margin analysis within the surgical suite. However, FS techniques suffer due to freezing artifacts during sample preparation, yielding an accuracy of only 84% for margin identification in lumpectomies. Moreover, prolonged operation is associated with increased risk of surgical-site infections, with likelihood of infection increasing to 13%, 17%, and 37% for every additional 15 minutes, 30 minutes, and hour of operation, respectively. As such, there is an unmet desire for highly-accurate diagnostic techniques that can produce H&E-like staining contrast within expedited intraoperative time-frames.

SUMMARY

Systems and method for optical imaging using focused lasers are presented which may offer a solution to longstanding problems of imaging samples such as biological tissues, rapidly with diffraction-limited sub-micron resolutions over large cm-scale fields of view without the sample becoming out of focus due to height variations during rapid scanning. The methods and systems may rely on multiple optical wavelengths being co-aligned and co-focused without optical alignment difficulties and with minimal chromatic aberration. In some cases, rapid scanning is disclosed with focal height compensation to enable sample loading with minimal need manual adjustment or other intervention. The optical designs may mitigate the need for re-alignment and may reduce the problem of co-focusing of multiple optical sources to maximizing power through a specialized optical fiber. The system and methods may be applicable to multiple forms of microscopy which involve a scanned focal spot, including confocal fluorescence or scattering microscopy, multi-photon or other nonlinear microscopies, and photoacoustic remote sensing microscopy. One embodiment may include measuring the sample height during scanning using optical coherence tomography and compensating the focal height using a focusing actuator. Another possible embodiment may involve parallelized light paths and multiple focal spots which may enable scanning multiple tissue specimens for virtual histological imaging within intra-operative time-frames.

Fast-scanning voice coil microscopy system with focal height compensation. Scanning the sample (or optics) using a voice-coil stage may have the ability to scan over a 1 cm2 area in 3.5 min with 800 nm resolution or in <8 min with 400 nm resolution. This may be parallelized as described below for even greater imaging throughput. However, it may be difficult to maintain optical focusing over such large scan areas. This may be in part due to imperfect tip-tilt of the stage, and dynamic tip-tilt and vertical displacements as the stage moves rapidly. This may be further exacerbated by uneven sample height during the scan. The disclosed solution may involve an optical profiling sub-system and dynamic focal height adjustment during scanning to achieve in-focus scanning over wide fields of view as rapidly as possible. A piezo-objective scanner may be one disclosed embodiment of achieving the focal height actuation. Optical coherence tomography (OCT) may be one preferred embodiment of an optical profiling sub-system.

A fast scanning wide-area high-resolution microscope system is disclosed comprising: one or more fast scanning sub-systems configured for sample scanning or optical beam scanning, at least one of the one or more fast scanning sub-systems employing mechanical scanning of focusing optics or a sample, and capable of peak scanning velocity of 0.5 meters per second and capable of 10 Hz or greater scanning frequency; one or more position feedback systems configured to track the position of the one or more fast scanning systems; one or more incident light sources, each configured to produce a distinct spectral content; optics configured to focus the one or more incident light sources onto a sample; detection optics comprising an achromatic focusing element configured to collect light scattered, reflected, transmitted, or emitted from the sample, the detection optics further comprising a spectral separator; one or more photodetectors; a data acquisition system; a control system; an optical profiling sub-system configured to sense height variations of the sample at different scanning positions; and a focus-adjust sub-system comprising an actuator that is configured to compensate an axial focusing position relative to the surface of the sample at different scanning positions by in use adjusting the sample or an optical focusing location of the optics to ensure the sample stays within a depth of focus from the focal point of the high-resolution microscopy system and so that the optical focusing location is no deeper than a threshold penetration depth.

A fast scanning wide-area high-resolution microscope system (for example with a resolution less than 1 micron) is disclosed comprising: one or more fast scanning systems configured for sample scanning or optical beam scanning; one or more position feedback systems configured to track the position of the one or more fast scanning systems; two or more light sources, each configured to produce a distinct spectral content; optics configured to focus the two or more light sources onto a sample; detection optics configured to collect light from the sample; one or more photodetectors; a data acquisition and control system; an optical profiling sub-system configured to measure height variations of the sample at different scanning positions; a focus-adjust sub-system comprising an actuator that is configured to compensate an axial focusing position relative to the surface of the sample at different scanning positions by in use adjusting the sample or an optical focusing location of the optics to ensure the sample stays within a depth of focus of the high-resolution microscopy system and so that the optical focusing location is no deeper than a threshold penetration depth.

In some embodiments, (I) fast-scanning microscopy system are disclosed with focal height compensation: A fast scanning wide-area high-resolution microscope system comprising; One or more fast scanning systems for sample scanning or optical beam scanning and at least one such system comprising an actuator capable of scanning >5 g loads more than 1 mm distances at greater than 10 Hz or being capable of rotating a mirror more than 1-degree at greater than 100 Hz; One or more position feedback systems for tracking position of the one or more fast scanning stages; Two or more light sources, each with distinct spectral content; Optics for focusing the light sources onto the sample with focal waist of at least one source being less than 5 microns throughout the scan; Detection optics for collecting light from the sample and detectors for detecting light with one or more photodetectors; An optical profiling sub-system to measure the height variations of the sample at different scan positions; A focus-adjust sub-system comprising an actuator which compensates the axial focusing position relative to the sample surface at different scan positions by adjusting the sample or the optical focusing location to ensure the sample stays within the depth of focus of the high-resolution microscopy system and so that the focus is no deeper than 2 mm or 3 times the 1/e penetration depth of the high-resolution microscopy system, whichever is less; and A data acquisition system and controller.

In some cases, the system may have one or more of the following features: The fast-scanning system comprising a voice coil actuator or comprising a galvanometer scanning mirror system or polygon scanning mirror system; The sample profiling sub-system comprising a photodetector; an interferometer, using a confocal aperture, focus and phase detection, projecting a pattern onto the optical image, comprising a Shack-Hartman wavefront sensor, comprising a camera system or comprising an optical coherence tomography system or comprising a processor with an algorithm to estimate the height variations from the interferometer; The focus-adjust sub-system comprising a piezo-actuator, voice coil actuator, vari-focal lens, MEMS deformable mirror or comprising an actuator to adjust the height or tip-tilt of the fast-scanning sample scanner; One of the optical sources comprising a source for an interferometer; The microscopy modality is reflection mode or transmission mode microscopy, confocal or multi-photon microscopy, stimulated Raman Scattering Microscopy, Coherent Anti-Stokes Raman Microscopy, photoacoustic microscopy, photoacoustic remote sensing microscopy, optical coherence microscopy, or some combination thereof; The position feedback system comprises a digital quadrature encoder, optical encoder, or linear variable differential transformer; and A parallelized implementation of the system where multiple co-focused light spots interrogate multiple regions simultaneously.

Co-launching of multiple co-aligned beams for multi-modal high-resolution microscopy plus OCT with minimal alignment complexity, long-term stability and mitigated need for re-alignment. Combining and co-focusing multiple disparate wavelengths in 3D with tight optical focusing and diffraction-limited performance is non-trivial. Moreover, often the wavelengths needed for the microscopy modality may be different than those needed for an Optical Coherence Tomography sub-system (as one embodiment of an optical profiling modality). Moreover, OCT may require a long-depth-of-focus, which determines the depth range, and is associated with a weakly focused non-diffraction-limited beam. This is in contrast to the need for very highly focused, high-Numerical Aperture focusing of light needed for diffraction-limited microscopies. To achieve such diffraction-limited focusing of multiple optical wavelengths with minimal alignment skill and minimal need for frequent re-alignment, the use of endlessly single-mode fibers is disclosed. Fiber propagation has traditionally been challenging for ultraviolet wavelengths. However, high-purity fused silica endlessly mode fibers may deliver single-mode transmission at any wavelength, including UV (ultraviolet). Bending losses may be more severe at UV wavelengths so minimal bending of this ESM fiber is disclosed. This approach may require only optimizing power out of the ESM for each respective input source and is less burdensome than free-space focal alignment of sub-micron spots in 3D. This approach may also suitable for long-term reliable operation with minimal re-alignment requirements. To additionally co-align this light with light for OCT, the OCT beam waist may be much smaller than the beam waist of other wavelengths needed for diffraction-limited performance. Combining these may be accomplished with an off-axis parabolic mirror or planar mirror with a through-hole (where OCT light is delivered) or with dichroics. The lens to focus light on the sample may include a refractive objective, aspheric lens, reflective objective, or a modified reflective objective (for optimal co-focusing of excitation and interrogation light with reflective optics and low-NA (numerical aperture) (low NA here means typically less than 0.2) focusing of OCT light with a dichroic-coated lens in place of a secondary spherical mirror, which may enable transmission of OCT wavelengths but reflection of other wavelengths.

A fast-scanning multi-wavelength microscope system is also disclosed comprising: two or more incident light sources, each configured to produce a distinct spectral content, at least one of which being an excitation source for high-resolution microscopy; a structured single mode fiber configured to convey one or more of: incident light from the two or more incident light sources; or emission or scattered light from a sample; an achromatic focusing element configured to focus the incident light from the two or more incident light sources onto the sample; a separator configured to collect one or more of: light scattered from one or more of the two or more incident light sources; or light emitted from the sample; one or more photodetectors; a scanning system configured to scan one or more of the optics, light from the two or more incident light sources, or the sample; and a controller configured to control the scanning system and to render images from photodetector data.

A fast scanning multi-wavelength microscope system is disclosed comprising: two or more light sources, each configured to produce a distinct spectral content, at least one of which being an excitation source for high-resolution microscopy; an endlessly single mode fiber configured to convey one or more of: excitation or additional light from the two or more light sources; or emission or scattered light from a sample; optics configured to focus a portion of light from the two or more light sources onto the sample; a separator configured to collect one or more of: light scattered from one or more of the two or more light sources; or light emitted from the sample; a photodetector; a scanning system configured to scan one or more of the optics, light from the two or more light sources, or the sample; and a controller configured to control the scanning system and to render images from photodetector data.

In some embodiments, systems and methods are disclosed for (II) co-launching of multiple co-aligned beams for multi-modal high-resolution microscopy plus OCT with minimal alignment complexity, long-term stability and mitigated need for re-alignment: A fast scanning multi-wavelength microscope system with minimal alignment complexity comprising; At least two light sources having different spectra, at least one of which being an excitation source for high-resolution microscopy; An endlessly single mode fiber for conveying excitation and/or additional light from the respective sources or for conveying emission or scattered light from the sample; Optics for combining the excitation, and other source(s) (if present) such that the beam waist of the excitation sources is narrower than the beam waist at least one other source; Optics for focusing of (a portion of) the combined light onto a sample with one or more focusing lenses or objectives; A separator, the collected light from the separator comprising two or more components comprising (a) light scattered from one or more of the sources or comprising (b) light emitted from the sample; A photodetection system comprising at least two detectors for detecting light collected from the separator; A scanning system to scan the focusing assemblies, scan the light, or to scan the sample(s); A controller to control scanning and to render images from detector data.

In some embodiments, the systems and methods may comprise one or more of the following features: The endlessly single mode fiber comprising anti-resonant silica hollow-core fibers, comprising fused silica materials, comprising a photonic crystal fiber, or comprising gas filled hollow-core structures, and such that the endlessly single mode fiber supports single mode close to a TEM00 mode at all the wavelengths of the system; Additionally comprising optics for refocusing scattered or emitted light from the sample back into an endlessly single mode fiber for confocal operation over multiple wavelengths; One of the light sources comprising a source for an optical profiling sub-system; The optical profiling sub-system comprising an interferometer, using a confocal aperture, focus and phase detection, projecting a pattern onto the optical image, comprising a Shack-Hartman wavefront sensor, comprising a camera system or comprising an optical coherence tomography system or comprising a processor with an algorithm to estimate the sample height variations from the interferometer; The photodetectors comprising one or more photodiodes, avalanche photodiodes, charge-coupled devices, CMOS or sCMOS detectors, camera systems, Shack-Hartman wavefront sensors, or spectrometer systems.

A focusing element is disclosed, for use on its own or in the above system, comprising a modified reflective objective where the secondary mirror is replaced with a lens having a dichroic mirror coating to enable the light for optical coherence tomography to pass and be focused with low numerical aperture while other wavelengths would be reflected and focused by the reflective objective with high numerical aperture; Optionally splitting the combined delivered light into different paths, optionally each path with its own focusing optics; Parallelized Fast-scanning voice coil microscopy system. To achieve maximum imaging throughput, and scan multiple tissue samples simultaneously, a parallelized approach is needed, however, focusing of multiple optical wavelengths to multiple diffraction limited spots over large scan areas with minimal alignment requirements is highly non-trivial. Disclosed is a method to achieve this using endlessly single mode fibers and reflective collimators plus splitting optics and scan height compensation for each path.

A modified reflective microscope objective lens is also disclosed comprising: a primary reflective curved mirror surface configured to focus light with diffraction-limited performance without chromatic aberrations and that comprises a through-hole; and a curved reflective or partially reflective secondary mirror surface that has a material that one or more of: permits reflection of a first set of wavelengths; permits transmission of a secondary set of wavelengths; or comprises a through-hole; and in which the modified reflective objective lens is configured to accept collimated or diverging light through the through-hole in the primary reflective curved mirror surface, reflect from the curved reflective or partially reflective secondary mirror surface, and then reflect from the primary reflective curved mirror surface and focus light with diffraction-limited performance without chromatic aberrations.

A modified reflective microscope objective lens is disclosed comprising: a primary reflective curved mirror surface configured to focus light with diffraction-limited performance without chromatic aberrations and that comprises a through-hole; a curved reflective or partially reflective secondary mirror surface that has a material that one or more of: permits reflection of a first set of wavelengths; permits transmission of a secondary set of wavelengths; or comprises a through-hole; in which the modified reflective objective lens is configured to accept collimated or diverging light through the through-hole in the primary reflective curved mirror surface, reflect from the curved reflective or partially reflective secondary mirror surface, and then reflect from the primary reflective curved mirror surface and focus light with diffraction-limited performance without chromatic aberrations.

In some embodiments, (III) a Modified Reflective Objective is disclosed. A modified reflective microscope objective comprising a primary reflective curved mirror surface designed to focus light with diffraction-limited performance without chromatic aberrations and which comprises a through-hole; a curved reflective or partially reflective secondary mirror which comprises either a material or coating that permits reflection of a first set of wavelengths and transmission of a secondary set of wavelengths or which comprises a through-hole; the modified reflective objective designed to accept collimated or diverging light through the through-hole in the primary mirror, reflect from the secondary mirror, then reflect from the primary mirror and focus light with diffraction-limited performance without chromatic aberrations.

In some embodiments, the systems and methods may incorporate one or more of the following features: Additionally comprising an optical focusing element, a transmissive element, dichroic mirror or filter; The through hole in the secondary mirror comprising a radius no larger than the radius at which light from the secondary mirror is reflected onto the primary mirror surface; The wavelength combining systems (I or II) comprising the modified reflective objective (III).

In various embodiments, there may be included any one or more of the following features: At least one of the one or more light sources is configured to define one or more of: a diffraction-limited focal waist; a minimum focal waist of less than 0.5 microns; a focal waist of less than 1 micron; or a focal waist of less than 5 microns throughout a scan. An actuator capable of: scanning loads greater than 5 grams, at more than 1 mm distances, at greater than 10 Hz; or rotating a mirror more than 1-degree at greater than 100 Hz. At least one of the two or more light sources is configured to define a focal waist of less than 5 microns throughout a scan. The focus-adjust sub-system is configured such that the threshold penetration depth is no deeper than 2 millimeters or 3 times a 1/e penetration depth of the fast scanning wide-area high-resolution microscope system, whichever is less. One or more of: a voice coil actuator; a galvanometer scanning mirror system; and a polygon scanning mirror system. One or more of: a voice coil actuator; a rotating gantry; a spinning disk; a galvanometer scanning mirror system; or a polygon scanning mirror system. The optical profiling sub-system comprises one or more of: an interferometer; a confocal aperture; a focus and phase detection sub-system that is configured to project a pattern onto an optical image; and a Shack-Hartman wavefront sensor. The optical profiling sub-system comprises one or more of: an interferometer; a confocal aperture; a focus and phase detection sub-system that is configured to project a pattern onto an optical image; a Shack-Hartman wavefront sensor; a camera system; an optical coherence tomography system; or a processor that is configured to execute an algorithm to sense or estimate the height variations or to find the optimal focusing position. The optical profiling sub-system comprises one or more of: a camera system; an optical coherence tomography system; or a processor that is configured to execute an algorithm to estimate the height variations from the interferometer. Additional separators and photodetectors are used to collect light associated with one or more of: endogenous fluorophore emission, including from but not limited to nicotinamide adenine dinucleotide+hydrogen (NADH) emission; flavin adenine dinucleotide (FAD) emission; collagen emission; exogenous fluorophore emission; scattering from incident sources; or information related to optical absorption. A processor is further used to extract information including mean intensity, peak intensity, lifetime, optical redox ratios, or optical absorption of the signals. The focus-adjust sub-system comprises one or more of: a piezo-actuator; a voice coil actuator; a vari-focal lens; or a micro-electro-mechanical system (MEMS) deformable mirror. The actuator of the focus-adjust sub-system is configured to adjust the height or tip-tilt of the fast-scanning system. An interferometer, in which one or more of the two or more light sources source for the interferometer. The fast-scanning sub-system is one or more of: capable of scanning at oscillation frequencies greater than: 20 Hz; 25 Hz; 50 Hz; or 75 Hz. The fast-scanning sub-system is one or more of: capable of scanning with peak speeds greater than: 1 m/s; or 5 m/s. Operating within a microscopy modality of one or more of: reflection mode microscopy; transmission mode microscopy; confocal or multi-photon microscopy; stimulated Raman Scattering Microscopy; Coherent Anti-Stokes Raman Microscopy; or optical coherence microscopy. The position feedback system comprises one or more of: a digital quadrature encoder; an optical encoder; or a linear variable differential transformer. Multiple co-focused light spots interrogating plural regions of one or more samples. The detection optics are configured to co-focus detected wavelengths with minimal or no chromatic aberration throughout the scan so as to ensure focal volume overlap for each detected wavelength, a focal volume for a given wavelength defined through the principle of reciprocity by a surface where the effective focal intensity drops to a pre-defined fractional threshold relative to the focal maximum, the threshold being greater than 0.1. Imaging a sample using the fast scanning wide-area high-resolution microscope system. Combining optics configured to combine the excitation or additional light, such that a beam waist of the excitation sources is narrower than a beam waist of at least one other of the two or more light sources. The photodetector has at least two detectors configured to detect light collected from the separator. The endlessly single mode fiber comprises one or more of: anti-resonant silica hollow-core fibers; fused silica materials; a photonic crystal fiber; or gas filled hollow-core structures. The endlessly single mode fiber is configured to support a single mode close to a TEM00 mode at all the wavelengths of the fast-scanning multi-wavelength microscope system. Refocusing optics configured to refocus scattered or emitted light from the sample back into an endlessly single mode fiber for confocal operation over multiple wavelengths. At least one of the two or more light sources comprises a source for an optical profiling sub-system configured to measure height variations of the sample at different scanning positions. The optical profiling sub-system comprises one or more of: an interferometer; a confocal aperture; a focus and phase detection sub-system that is configured to project a pattern onto an optical image; and a Shack-Hartman wavefront sensor. The optical profiling sub-system comprises one or more of: a camera system; an optical coherence tomography system; or a processor that is configured to execute an algorithm to estimate the height variations from the interferometer. The photodetector comprises one or more of: a photodiode; an avalanche photodiode; a charge-coupled device; a complementary metal-oxide-semiconductor (CMOS) or scientific complementary metal-oxide-semiconductor detector; a camera system; a Shack-Hartman wavefront sensor; and a spectrometer system. A focusing element, which comprises a modified reflective objective where a secondary mirror is replaced with a lens having a dichroic mirror coating to enable the light for optical coherence tomography to pass through and be focused with low numerical aperture, while other wavelengths are reflected and focused by the reflective objective with high numerical aperture. Optics configured to split the combined delivered light into different paths, each path having its own focusing optics. Imaging a sample using the fast-scanning multi-wavelength microscope system. One or more of: an optical focusing element; a transmissive element; a dichroic mirror; or a filter. The through-hole in the curved reflective or partially reflective secondary mirror surface defines a radius no larger than a radius at which light from the curved reflective or partially reflective secondary mirror surface is reflected onto the primary reflective curved mirror surface. Imaging a sample using the modified reflective microscope objective.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which:

FIG. 1A-1 is a diagram of a hybrid opto-mechanical ultraviolet photoacoustic remote sensing (UV-PARS) scanning technique.

FIG. 1A-2 is a diagram of a sample undergoing the hybrid opto-mechanical UV-PARS scanning technique of FIG. 1A-1.

FIG. 1A-3 is an example image of a sample viewed using the hybrid opto-mechanical UV-PARS scanning technique of FIG. 1A-1.

FIG. 1B-1 is a diagram of a line scanning UV-PARS scanning technique.

FIG. 1B-2 is a diagram of a sample undergoing the line scanning UV-PARS scanning technique of FIG. 1B-1.

FIG. 1B-3 is an image of a sample viewed using the line scanning UV-PARS scanning technique of FIG. 1B-1.

FIG. 1C-1 is a diagram of a voice-coil based UV-PARS scanning technique.

FIG. 1C-2 is a diagram of a sample undergoing the voice-coil based UV-PARS scanning technique of FIG. 1C-1.

FIG. 1C-3 is an image of a sample viewed using the voice-coil based UV-PARS scanning technique of FIG. 1C-1.

FIG. 2 is a system diagram of the voice-coil based UV-PARS system of FIG. 1C-1.

FIG. 3A is a diagram of a sample undergoing the voice-coil based UV-PARS scanning technique of FIG. 1C-1.

FIG. 3B is a diagram of the sample undergoing the voice-coil based UV-PARS scanning technique of FIG. 3A.

FIG. 3C is a graph of various readings generated during the voice-coil based UV-PARS scanning technique of FIG. 3B.

FIG. 4A is a perspective view of a voice-coil stage system.

FIG. 4B is a perspective view of a glass slide with a sample holder and UV coverslip, to be used in the disclosed systems and methods.

FIGS. 4C-D are a sequence of diagrams illustrating the preparation of a sample to be viewed using the voice-coil based UV-PARS scanning technique of FIG. 1C-1.

FIG. 5A is a UV-PARS image of a sample viewed using the voice-coil based UV-PARS scanning technique of FIG. 1C-1, taken at 500 nm mean sample resolution.

FIG. 5B is an example image illustrating the true Hematoxylin and eosin (H&E) stained thin section of FIG. 5A.

FIG. 5C is an enlarged view of the area defined by the 5C dashed lines of FIG. 5A.

FIG. 5D is an enlarged view of the area defined by the 5D dashed lines of FIG. 5B.

FIG. 5E is an enlarged view of the area defined by the 5E dashed lines of FIG. 5A.

FIG. 5F is an enlarged view of the area defined by the 5F dashed lines of FIG. 5B.

FIG. 6A is a UV-PARS image of a sample viewed using the voice-coil based UV-PARS scanning technique of FIG. 1C-1.

FIG. 6B is an enlarged view of the area defined by the 6B dashed lines of FIG. 6A.

FIG. 6C is an enlarged view of the area defined by the 6C dashed lines of FIG. 6B.

FIG. 6D is an enlarged view of the area defined by the 6D dashed lines of FIG. 6B.

FIG. 7A is a UV-PARS virtual histology image of a sample viewed using the voice-coil based UV-PARS scanning technique of FIG. 1C-1.

FIG. 7B is an enlarged view of the area defined by the 7B dashed lines of FIG. 7A.

FIG. 7C is an enlarged view of the area defined by the 7C dashed lines of FIG. 7B.

FIG. 15A is a diagram of an embodiment of a disclosed system for widefield fast-scanning stimulated Raman Scattering (SRS) or Coherent Anti-Stokes Raman (CARS) microscopy.

FIG. 15B is an enlarged diagram of the area defined by the dashed circular lines in FIG. 15A.

FIG. 19 is a diagram of an embodiment of a system for Parallelized Microscopy with a Rotational Stage Mechanism.

DETAILED DESCRIPTION

Figures 1, 1B:
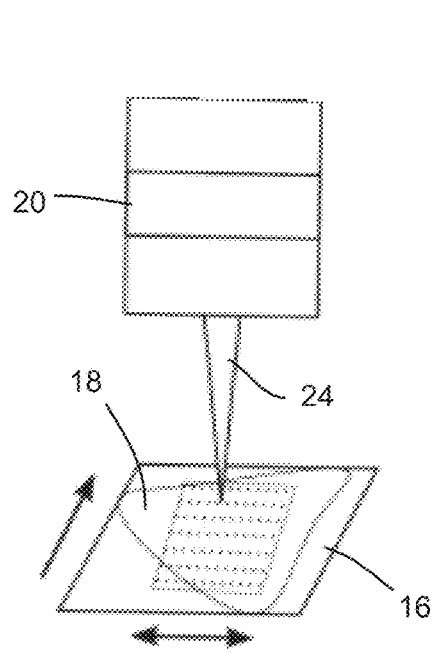

Immaterial modifications may be made to the embodiments described here without departing from what is covered by the claims.

Over recent decades, there has been a drive to realize virtual histology images using optical imaging modalities, including imaging techniques such as stimulated Raman scattering, multi-photon fluorescence, confocal fluorescence microscopy, microscopy with ultraviolet surface excitation, and light sheet microscopy.

Recently, a novel label-free imaging technique known as photoacoustic remote sensing (PARS) microscopy has been developed. In PARS microscopy, a pulsed excitation beam is co-focused with a continuous wave detection beam to scan over a region of tissue. By using the photoacoustic-induced modulations of the back-scattered detection beam, an absorption-contrast image can be formed. PARS microscopy has demonstrated the ability to image a variety of endogenous biological structures, including vasculature with 532 nm excitation, lipids with 1225 nm excitation, and cell nuclei with ultraviolet 266 nm excitation (UV-PARS). Since UV-PARS microscopy can image distributions of nuclei with fine resolution, it serves as a promising modality for virtual histopathological applications. Virtual histology images may be obtained by using UV-PARS images combined with simultaneously acquired 1310 nm scattering images, where the UV-PARS scan corresponds to a nucleic contrast (virtual hematoxylin stain) and the scattering scan corresponds to cytoplasmic contrast (virtual eosin stain). Enhanced scattering resolution may be achieved by measuring the average intensity of the back-scattered 266 nm excitation pulse, thus demonstrating both virtual hematoxylin and eosin stains with matched. Further work has demonstrated both radiative and non-radiative contrast after PARS excitation. Moreover, UV-PARS histology can be combined with imaging modalities such as optical coherence tomography (OCT).

Early iterations of UV-PARS microscopy employed two galvanometer mirrors for scanning of the co-focused beams through the objective lens, yielding 250×250 µm² UV-PARS images. However, this technique requires extremely long scanning times to enable imaging over large areas, due to the requirement for inter-tile translation. Large-area virtual histology images of whole-slide FFPE sections with UV-PARS microscopy have been demonstrated, but were generated at slow rates of 1.5 min per mm² with 500 nm sampling resolution, scaling to a 1 cm2 area in 2.5 hours. Increases in imaging speed were obtained through mosaic strip scanning, which was used to generate 5×10 mm2 images in 3.5 minutes. While this system is capable of rapid imaging speeds over large areas, it requires the use of a smaller numerical aperture (NA) objective lens and so the degraded optically-focused lateral resolution of 0.86 µm limits the diagnostic utility of the generated nuclei images. Accurate histopathological diagnosis requires an equivalence of 200× magnification, such that both internuclear and intranuclear details can be delineated. As such, the hybrid-optomechanical UV-PARS scanning technique demonstrated in is suitable for gross scans only.

Previous iterations of UV-PARS microscopy have demonstrated either fine resolution (<500 nm sampling) images or rapid imaging speeds, but no UV-PARS system to date has achieved the combined feat of performing fine resolution scans within intraoperative time-frames. FIG. 1 compares the maximum speed and resolution capabilities of recent UV-PARS iterations with the scanning technique disclosed. A UV-PARS microscopy system 10 is disclosed based on voice-coil stage scanning 13, which may achieve sub-micron resolution and rapid scanning rates over mm-scale regions, thus demonstrating the potential of UV-PARS microscopy for translation to a clinical setting. In this disclosure illustrates voice-coil UV-PARS imaging on both thin slide FFPE sections 21 of human prostate as well as fresh murine liver.

Referring to FIGS. 1A-1-1C-3 a comparison between UV-PARS scanning techniques is illustrated. A hybrid optomechanical scanning (FIGS. 1A-1-1A-3) is illustrated. The galvanometer mirror 22 may sweep the beam 24 in the y-direction 26 as the stage 16 traverse the x-direction 30A. Mosaic strips 27 may be concatenated to create a relatively large FOV. A line scanning method (FIGS. 1B-1-1B-3) is illustrated. The stage 16 may scan horizontal lines 29, stepping vertically between line scans. A voice-coil based UV-PARS scanning system 10 (FIGS. 1C-1-1C-3) is illustrated. A voice-coil stage 16A may oscillate in the horizontal direction, for example arrow 36, while a stepper stage 16C may traverse the vertical direction, for example arrow 30B, to create a sinusoidal scanning trajectory, for example line 34. To deal with the challenge of combining multiple disparate wavelengths including UV wavelengths, endlessly single mode fibers 104 may be used. The endlessly single mode fiber 104 may be configured to support a single mode close to a TEM00 mode at a multiplicity of, for example at all the wavelengths of the fast-scanning multi-wavelength microscope system 10.

Yu et al. successfully achieved pulsed 266 nm transmission sustained over many hours by using pure fused silica anti-resonant silica hollow-core fibers (AR-HCFs). UV transmission in optical fibers may be challenging due to solarization issues. Successful UV transmission has been achieved through pulsed 266 nm transmission sustained over many hours by using pure fused silica anti-resonant silica hollow-core fibers (AR-HCFs). Other related photonic crystal fibers designed to be endlessly single mode, and comprised of a pure fused silica core may provide good non-degraded transmission, especially if the bending is minimized. Such endlessly single mode fibers may also transmit other wavelengths with single mode-like performance and no higher order mode cut-off which is otherwise a limitation of most other single mode fibers.

Problems to be Solved Include

1) Scanning a sample 18 over large mm- or cm-scale areas with diffraction-limited sub-micron optical resolution and micron-scale or sub-micron depth-of-focus may be difficult, especially when it needs to be done in fast imaging times such as in intra-operative imaging times (<5 min). Doing so with multiple wavelengths may be even more challenging. Scanning a sample 18 fast may lead to height variations if the stage tip-tilt is not perfectly level or if the stage tip tilt or height changes during scanning. Scanning thin sections may lead to the thin section becoming out of the depth of focus and scanning thick samples 18 may lead to the optical focus being too deep in the tissue if sample 18 height variations are larger than the depth of penetration.

2) Co-aligning different wavelengths with sub-micron spot sizes in 3D may be very challenging. Co-launching into single mode fiber may be problematic due to wavelength cut-offs for single mode operation. Launching multiple wavelengths into a multi-mode fiber may be possible but then light from the multi-mode fiber cannot easily be focused to diffraction-limited spots.

3) If one of the delivered wavelengths is UV-UV guided fiber transmission may be challenging owing to solarization.

4) The alignment of multiple beams co-focused a sub-micron size-scale may change over time due to laser pointing stability, temperature variations and stresses in the system 10. An alignment-free approach or approach to minimize the frequency of alignment is greatly needed.

5) Widefield virtual histology of stained tissue samples 18 has been approached using two-photon scanning of stained tissues but scanning speed was prohibitive 6) Widefield virtual histology of stained tissue samples 18 has also been approached using MUSE but it tended to acquire more than one cellular layer creating confusion for pathologists.

7) Widefield virtual histology of stained tissue samples 18 has also been approached using light-sheet microscopy, but it produced volumes with unreasonable data sizes for wide regions of tissue. Moreover, spatial resolution was somewhat limited with the technique unable to compete with resolution of very-high-magnification white light microscopes.

Description of Preferred Embodiments

Figures 1, 1B, 2:
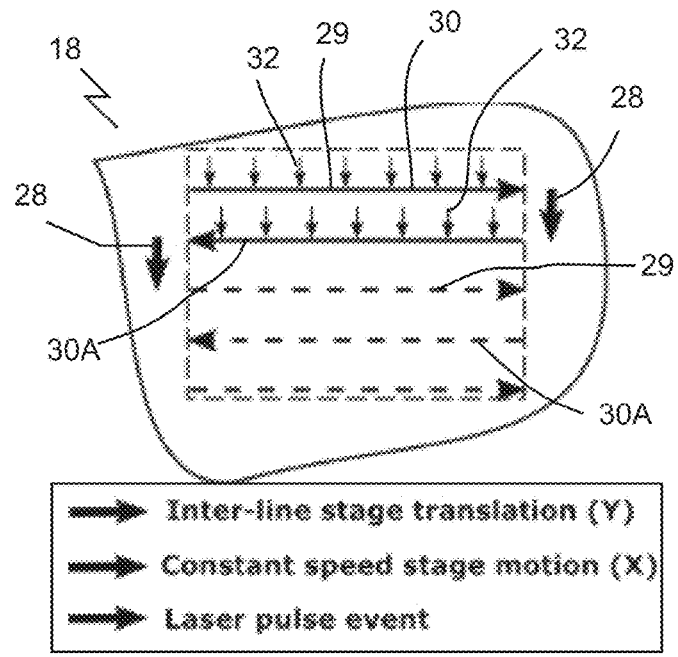
Figures 1, 1B, 2, 3:
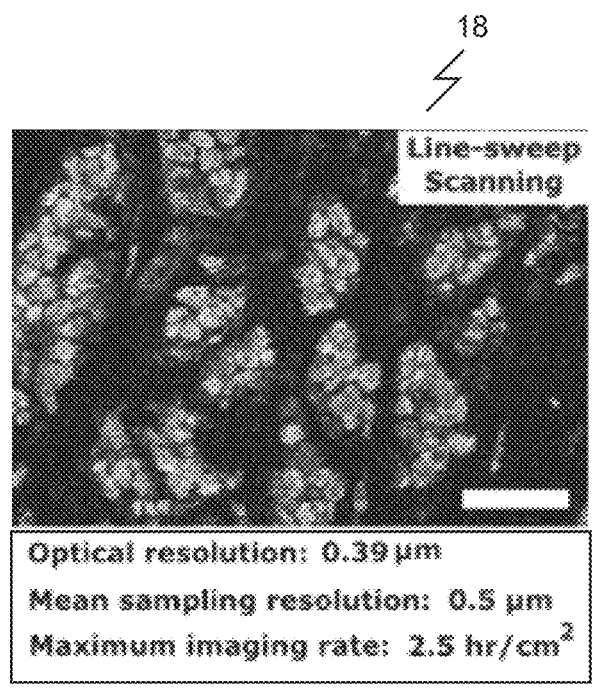
Figure 2:
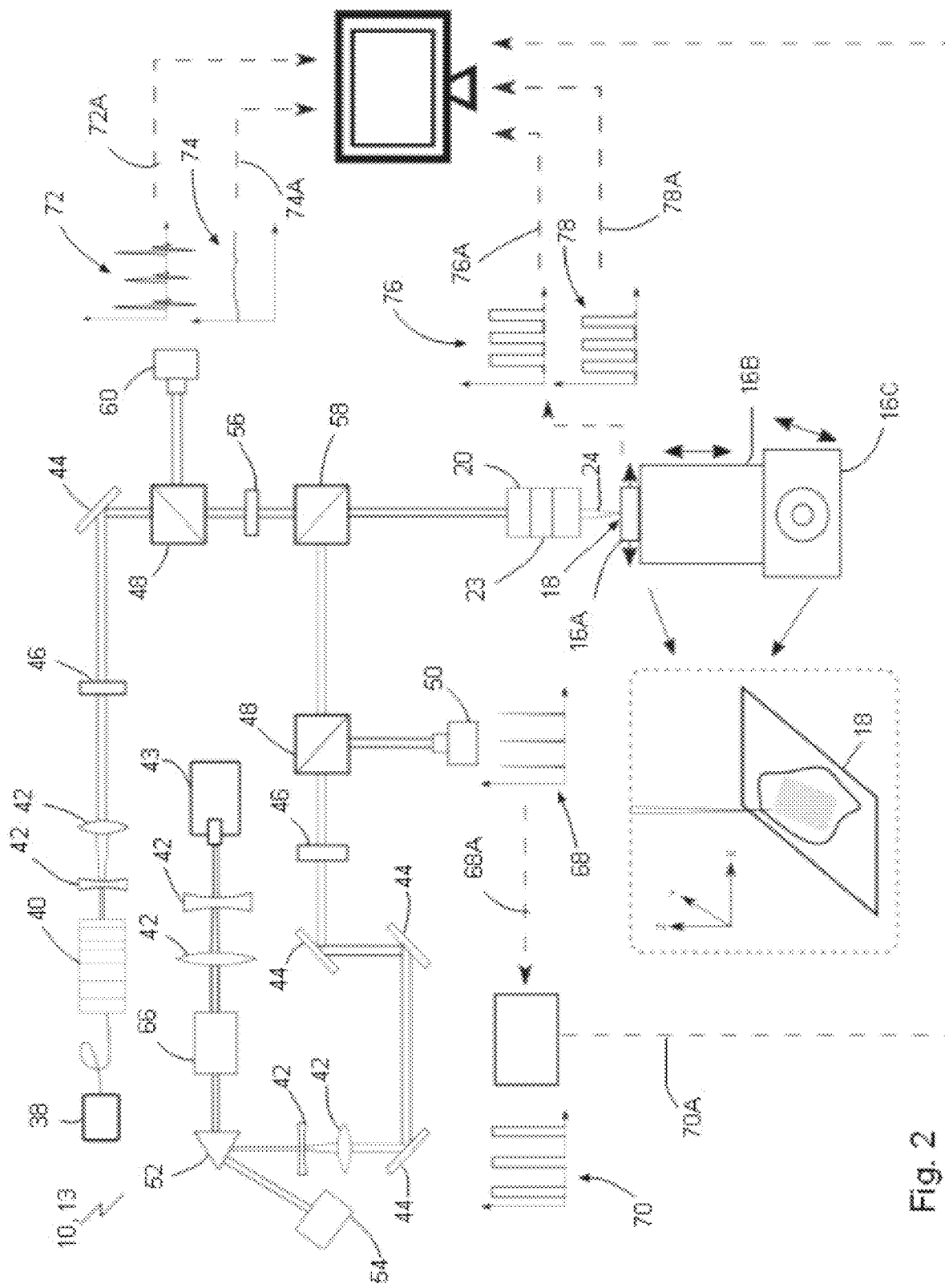

Several embodiments of widefield high-resolution microscopy using optical profiling guidance for focal height compensation are described, including for various embodiments of high-resolution microscopy such as confocal fluorescence microscopy, nonlinear/multi-photon microscopy, Stimulated Raman/Coherent Anti-Stokes Raman microscopy and photoacoustic remote sensing microscopy. Detailed methods for voice-coil based photoacoustic remote sensing microscopy and describe the potential for rapid high-resolution scanning over cm-scale fields of view within minutes are disclosed. A discussion of limitations and how the disclosed OCT-guided height compensation is disclosed. Methods for an Embodiment Involving Photoacoustic Remote Sensing Microscopy:

Referring to FIG. 2, a system 10 is illustrated as a UV-PARS systems with a novel scanning approach. The system 10 may comprise one or more fast scanning sub-systems that may be configured for sample scanning or optical beam scanning. At least one of the one or more fast scanning sub-systems may employ mechanical scanning, and be capable of peak scanning velocity of 0.5 meters per second and capable of 10 Hz or greater scanning frequency. As an example calculation for fast scanning: for scan width=10 mm, 10 Hz scan frequency vp=pi*0.01*10/266e-9=1.1810e+06. In some cases, the system 10 may be capable of imaging at a rate of 1 cm^2 in less than 10 minutes with mean lateral optical resolution and mean sampled resolution less than 1 micron. The system 10 may comprise one or more position feedback systems configured to track the position of the one or more fast scanning systems. The system 10 may comprise one or more, for example two or more, incident light sources (for example diodes/lasers 38 and 43). In some cases the light sources may each be configured to produce a distinct spectral content, for example an excitation path and a detection path. The width of the focal waist of at least one of the incident light sources may be configured so as not to vary by more than a threshold percent during the scanning process, the threshold being less than 100%. At least one of the two or more light sources (such as laser 43) may be an excitation source for high-resolution microscopy. At least one of the one or more light sources may be configured to define one or more of: a diffraction-limited focal waist; a minimum focal waist of less than 0.5 microns; a focal waist of less than 1 micron; or a focal waist of less than 5 microns throughout a scan. At least one of the two or more light sources may be configured to define a focal waist of less than 5 microns throughout a scan. The system 10 may comprise one or more of a voice coil actuator 14, a rotating gantry (not shown), a spinning disk (not shown), a galvanometer scanning mirror system 22, or a polygon scanning mirror system (not shown). The system 10 may comprise detection optics, for example comprising an achromatic focusing element configured to collect light scattered, reflected, transmitted, or emitted from the sample, the detection optics further comprising a spectral separator. In the excitation path, the beam from a 532 nm 10 kHz-2 MHz pulsed laser 43 (SPFL-532-40, MKS™) may be beam reduced prior to being frequency doubled to generate 266 nm radiation via a CLBO crystal 66 (CLBO-501S, EKSMA™) and then spectrally separated through a prism 52 (PS863, Thorlabs™). The UV beam may be expanded and directed through a half-waveplate 46 (WPH05M-266, Thorlabs™) and polarizing beam-splitter 48 (PBS) (10SC16PC.22, Newport™). The reflected portion of the beam may be used for optical event triggering 68 via a silicon photodiode 50 (PDA10A, Thorlabs™), in which the generated electrical pulse may be passed through a digital delay generator 62 (DG645, SRS™) for digital event recognition, as illustrated by line 68A. The transmitted portion of the 266 nm beam may be directed towards a harmonic beam-splitter 58 (HBSY134, Thorlabs™) for beam-combination. In the detection path, a 1310 nm super luminescent diode 38 (SLD) (SLD1018S, Thorlabs™) may be fiber-coupled to a zoom-collimator 40 (ZC618APC-C, Thorlabs™) prior to beam expansion. The beam may be directed through a half-waveplate 46 (WPH05-1310, Thorlabs™) and polarizing beam-splitter 48 (CCM1-PBS254, Thorlabs™). The transmitted portion of the beam may pass through a quarter-waveplate 56 (WPQ10M-1310, Thorlabs™) which may convert the 1310 nm beam to a circular polarization. One or more photodetectors may be used. Upon back-scattering, the 1310 nm detection beam may have the opposite polarization and thus be reflected by the polarizing beam-splitter 48, which may direct the beam towards a 75 MHz balanced photodetector 60 (PDB420C-AC, Thorlabs™) for extraction of the PARS 72 and scattering 74 signals. The system 10 may comprise one or more photodetectors 60. The one or more photodetectors 60 may comprise one or more of a photodiode 50, an avalanche photodiode 114, a charge-coupled device, a complementary metal-oxide-semiconductor (CMOS) or scientific complementary metal-oxide-semiconductor detector, a camera system, a Shack-Hartman wavefront sensor 94, and a spectrometer system. The optical profiling sub-system may comprise one or more of: an interferometer; a confocal aperture; a focus and phase detection sub-system that is configured to project a pattern onto an optical image; a Shack-Hartman wavefront sensor; a camera system; an optical coherence tomography system; or a processor that is configured to execute an algorithm to sense or estimate the height variations or to find the optimal focusing position. The one or more photodetectors 60 may each have at least two detectors configured to detect light collected from the separator. After photodetection, the PARS 72 signal may be passively band-pass filtered through an 11 MHz inline low-pass filter (BLP-10.7+, Mini-Circuits™) and a 1.8 MHz high-pass filter (EF509, Thorlabs™). The system 10 may comprise optics, which may be configured to focus the two or more light sources onto a sample 18, for example lenses 42, 20, 23, and others. The system 10 may be configured to create multiple co-focused light spots interrogating plural regions of one or more samples. Light may pass through other optical elements, such as a harmonic beam-splitter 58, where the 266 nm and 1310 nm beams may be combined and co-focused onto the sample 18 through a 0.5 NA reflective objective lens 23 (LMM40X-UVV, Thorlabs™) for sample scanning. A vertical translation stage 16B (X-VSR20A-E01, Zaber™) may be utilized to adjust the sample height relative to the beam foci. The lateral and axial optical resolution for UV-PARS was previously characterized as 0.39 µm and 1.2 µm, respectively. A separator (such as beam splitters 48 and 58) may be configured to collect one or more of light scattered from one or more of the two or more light sources, or light emitted from the sample 18. The fast scanning wide-area high-resolution microscope system 10 may be used to image a sample 18. Referring to FIG. 3, a scanning system may be configured to scan one or more of the optics, light from the two or more light sources, or the sample 18.

Referring to FIG. 3, one or more position feedback systems may be configured to track the position of the one or more fast scanning systems. a voice-coil stage 16A with 100 nm encoder resolution (X-DMQ12L-AE55D12, Zaber™) may oscillate in the x-direction, for example arrow 36, and is mounted atop a stepper stage 16C (PLS-85, PI™) which may traverse the y-direction, for example arrow 30B at a constant velocity. To track absolute position in the x-direction, two analog quadrature encoder channels from the voice-coil stage may be captured and digitized, with the successive states of each signal ('0' or '1') being recorded at each rising or falling edge. By analyzing the successive encoder state changes, an x-position trajectory is incrementally constructed in MATLAB™. The y-position trajectory may be constructed by simply recording the times at which each encoder state change occurs and multiplying by the known constant velocity of the stepper stage. The combination of the x- and y-trajectories may yield a sinusoidal scanning pattern in the focal plane. At each digital trigger 70 event, the filtered PARS 72 signal may be integrated over a 500 ns window, while the scattering 74 signal is averaged over the same window. To map the PARS 72 event to an absolute position within the scanning trajectory, the digital trigger 70 rising edge event may be linearly interpolated between the nearest two encoder edges in time, as shown in FIG. 3.

Referring to FIG. 2, a diagram for an example voice-coil based UV-PARS system 10 is illustrated. The system 10 may comprise one or more of data acquisition and control systems 64. The position feedback system may comprise one or more of a digital quadrature encoder, an optical encoder, or a linear variable differential transformer. For data acquisition, a 125 MHz 14-bit digitizer (CSE8389, GaGe™) may stream five data channels at 25 MS/s, which are the PARS 72 and scattering 74 signals, two quadrature encoder channels for position tracking, for example encoder channel A 76 and encoder channel B 78, and a trigger signal from the digital delay generator, for example digital trigger 70. The voice-coil position may be determined by analyzing the state changes on both of the quadrature encoder channels 76 and 78 in a sequential manner. As such, all waveforms may be streamed continuously for an acquisition system 64 which may use a single digitizer card. The sample rate of 25 MS/s may be able to sufficiently sample both quadrature encoder channels 76 and 78 as well as the filtered PARS 72 signal. As mentioned previously, the PARS signal may be high-pass filtered at 1.8 MHz, which may serve the purpose of removing low-frequency signal fluctuations due to stage motion, and the 11 MHz low-pass filter may serve to elongate the signal enough to be sampled at the 25 MS/s streaming rate. However, it should be noted that filtering the PARS 72 signal may remove spectral energy, and thus ultimately degrade the signal-to-noise ratio (SNR). For scanning a ~1 cm2 area in 3.5 minutes at 1 µm mean sampling resolution or 8.8 minutes at 400 nm mean sampling resolution, this may require a total of 51 GB and 127.5 GB of data to be acquired for processing, respectively.

After extracting the position-based PARS 72 and scattering 74 data, the data sets may be interpolated on a 2D grid via Delauney triangulation, with the point-spacing of the grid set to be the mean lateral sampling resolution for the scan in question. After interpolating both data sets to obtain independent PARS 72 and scattering 74 images, the images may be histogram equalized in MATLAB™ to maximize contrast.

After extracting the position-based PARS 72 and scattering 74 data, the data sets may be interpolated on a 2D grid via Delauney triangulation, with the point-spacing of the grid set to be the mean lateral sampling resolution for the scan in question. After interpolating both data sets to obtain independent PARS 72 and scattering 74 images, the images may be histogram equalized in MATLAB™ to maximize contrast.

While the unloaded voice-coil stage 16A may be capable of oscillating the 1.2 cm full-travel range (FTR) at 25 Hz, the stage 16A load will place an upper-limitation on scanning frequency. For a sinusoidal acceleration curve, the maximum acceleration may be expressed by $$a_{max} = \frac{W}{2}(2\pi f)^2$$

where W is the image width and f is the bi-directional voice-coil stage 16A frequency. Given that the voice-coil stage 16A may exert a maximum constant force-over-travel of F=15N, this allows for the stage 16A to drive a mass of m=ms+ml=F/$a_{max}$ where ms=95 g is the mass of the moving stage-top and ml is the secured load mass. The maximum scanning frequency of the voice-coil stage 16A at a given image width and load mass may be expressed as $$f_{max} = \frac{1}{2\pi}\sqrt{\frac{2F}{W(m_s + m_l)}}$$

The chosen speed of the slow-axis (stepper) stage 16C is determined by the bi-directional scanning frequency and the desired sampling resolution in the y-direction. This may be expressed as $$vs = 2fDy$$

where vs is the constant velocity of the slow-axis stage 16C and D y is the desired mean sampling resolution in the y-direction. The laser pulse repetition rate (PRR) may be chosen to match the x-resolution to the y-resolution, such that the time between sequential laser pulses 32 may yield the desired sample 18 resolution when the voice-coil stage 16A is at peak velocity. With the peak velocity of the voice-coil stage 16A written as v p=πfW, the minimum required laser repetition rate will be $$PRR = \frac{v_p}{D_x} = \frac{\pi fW}{D_x}$$

where D x is the desired sampling resolution in the x-direction. Lastly, assuming matched x and y sampling resolutions (D=D x=D y), the total scanning time may be calculated using the slow-axis stage 16C speed and the desired image height H as $$t_{scan} = \frac{H}{v_s} = \frac{H}{2fD}$$

As an example, for a 10 g sample 18 load, the stage 16 may oscillate the full 1.2 cm range at 25 Hz and thus create a 1.2×0.83 cm2 (~1 cm2) image at fine 400 nm sampling resolution in 7 minutes. Additionally, gross scans may be performed at 1 µm sampling resolutions in 2.8 minutes. Performing voice-coil scans with these parameters could address the unmet needs of speed, resolution, and field-of-view for intraoperative virtual histology.

Referring to FIGS. 3A-C, a voice-coil scanning 13 methodology is illustrated. FIG. 3A illustrates a combined slow-axis 16C-1, for example the constant stage 16 motion in the Y direction 30B, and a fast axis 16A-1, for example a voice-coil stage 16A motion 36. The combined slow-axis 16C-1 and fast axis 16A-1 may yield a sinusoidal scanning trajectory, for example a continuous scanning trajectory 34, across the tissue sample 18. FIG. 3B illustrates a sampling resolution characterization of the sinusoidal scanning trajectory 34. Laser pulse events 32 may form the sinusoidal scanning trajectory 34. FIG. 3C illustrates a time-resolved depiction of the acquired signals in a particular segment of the scan trajectory 34. Laser excitation events 32 may be linearly interpolated between the two nearest encoder edges. PARS 72 and scattering 74 signals may be processed over a 500 ns time period.

To demonstrate the virtual histology capabilities of the voice-coil UV-PARS system 10, imaging was performed on both thinly sectioned FFPE slides 21 as well as fresh thick murine liver. Quartered FFPE thin sections 21 of human prostate tissue were obtained from radical prostatectomy patients as per approved ethics (HREBA (Cancer)/ HREBA.CC-20-0145). Thin FFPE sections 21 were obtained only after the relevant pathology cases were closed and the tissue flagged for disposal, with all identifying patient information being redacted. For fresh thick tissue imaging, murine liver was extracted from a Swiss Webster mouse (CFW, Charles River™) which were procured in accordance with the University of Alberta's Animal Care and Use Committee ethics guidelines and regulations. Methods for securing both FFPE thin tissue and fresh thick tissue samples 18 to the imaging platform are displayed in FIG. 4.

To validate the voice-coil UV-PARS system 10 scanning capabilities, imaging was performed on a thin-slide FFPE section 21 obtained from radical prostatectomy patients. Demonstrated in FIG. 5 is a ~2×2 mm2 UV-PARS image of human prostate tissue (left) alongside the true bright-field H&E image of an adjacent tissue section (right). The UV-PARS scan was completed at a 25 Hz bi-directional voice-coil scanning 13 frequency and a 313 kHz laser PRR to obtain a 2×2 mm2 scan at 500 nm mean sample resolution in 1.33 minutes. Images were taken using pulse energies of ~5 nJ, with the UV-PARS image demonstrating an SNR of 30.1 dB, where SNR was calculated by taking the ratio of the mean value over a representative nuclei to the standard deviation of the background noise. It should be noted that since the true H&E image is an adjacent section to the UV-PARS image, there will be close similarities in nucleic structure, but the images will not have one-to-one concordance. As shown in the red inset of FIG. 5, the UV-PARS scan can distinguish both intranuclear and internuclear structure. The green and red arrows of the adjacent H&E image display two variations of cell nuclei. It can be seen that the solid dark-purple nuclei of the adjacent section corresponds to the brightest nuclei in the UV-PARS image, while the translucent light-purple nuclei corresponds to the lighter-gray nuclei in the UV-PARS image. Moreover, the fine resolution UV-PARS scan is not only capable of distinguishing between the two variations of nuclei, but can also resolve intranucleic structure seen in the nuclei highlighted by the red arrows.

Referring to FIG. 4A-D, a voice-coil stage 16A and methods of use are shown. The voice-coil stage 16A may have a custom slide container 19 and a thin-slide FFPE section 21. The custom slide container 19 may be used to house a slide 17. The slide 17 may be equipped with a sample holder 18A and a suitable coverslip, for example a UV coverslip 15. The sample holder 18A and coverslip 15 may be used to secure a sample 18 to the slide 17, for example, the sample holder 18A may be secured to the slide 17 and the coverslip 15 may be secured to the top of the sample holder 18A once a sample 18 has been placed inside the sample holder 18A. Once a sample 18 is prepared on the slide 17, it may be viewed using a suitable method, for example through an objective lens 20.

Referring to FIGS. 5A-F, a sample 18 may be compared using voice-coil UV-PARS and the adjacent true H&E thin section. The comparison between the voice-coil UV-PARS image taken at 500 nm mean sample resolution (FIGS. 5A, 5C and 5E) and the adjacent true H&E thin section (FIGS. 5B, 5D and 5F). FIG. 5A illustrates an UV-PARS image of an FFPE thin section 21 of human prostate tissue, and FIG. 5B illustrates the corresponding true H&E thin section. The scale bar of FIGS. 5A and 5B is set at 500 µm. FIG. 5C illustrates an UV-PARS image of the blowout and FIG. 5D illustrates the corresponding true H&E region. The scale bar of FIGS. 5C and 5D is set at 250 µm. FIG. 5E illustrates an UV-PARS image of the blowout region and FIG. 5F illustrates the corresponding true H&E section. The UV-PARS images demonstrate the variations in nucleic structure, shown by the arrows. The scale bar of FIGS. 5E and 5F is set at 100 µm.

Referring to FIGS. 6A-D, a sample 18 may be viewed using voice-coil UV-PARS imaging. FIG. 6A illustrates a UV-PARS image of a region of fresh murine liver, with a scale bar of 500 µm. FIG. 6B illustrates the region within the dashed lines of FIG. 6A, with a scale bar of 250 µm. FIG. 6C illustrates the region within the upper dashed lines of FIG. 6B, with a scale bar of 100 µm. FIG. 6D illustrates the region within the lower dashed lines of FIG. 6B, with a scale bar of 100 µm.

Figure 8:
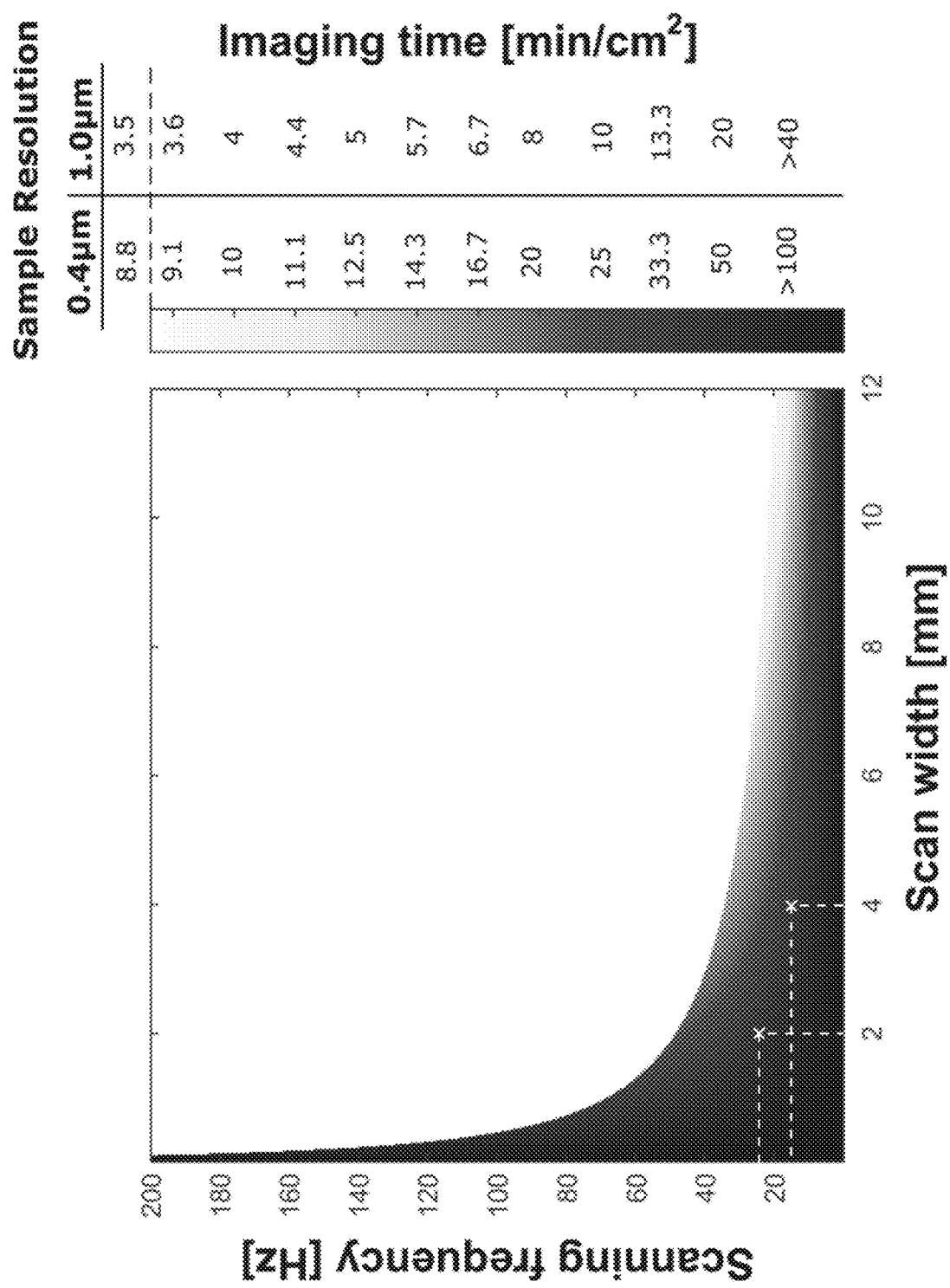
FIG. 8 is a heat-map graph of the imaging time as a function of scanning width and frequency.

Referring to FIG. 8, the scanning time, frequency, and amplitude characteristics of the voice-coil system 10 is illustrated. Shown in FIG. 8 is a heat map of the voice-coil operation where the cm2 imaging time is color-encoded as a function of scanning width and oscillation frequency, assuming a moving stage mass of 162 g. Displayed by the cross-hairs at 2 mm and 4 mm are the voice-coil operating points at which the 2×2 mm2 image (FIG. 5) and 4×4 mm2 images (FIG. 6, 7) were taken, respectively. As shown in the heat map, maximum imaging rates for the voice-coil UV-PARS system 10 may be attained at the largest scanning amplitudes. The 2×2 mm2 UV-PARS image at 500 nm mean point spacing of FIG. 5 was demonstrated at a scanning frequency of 25 Hz, approximately half of the maximum oscillation frequency. For the 4×4 mm2 scan at 900 nm mean point spacing, the operating frequency was 15 Hz, less than two times the maximum oscillation frequency.

Referring to FIGS. 7A-C, a sample 18 may be viewed using voice-coil UV-PARS imaging. FIG. 7A illustrates a UV-PARS virtual histology image of a region of fresh murine liver, with a scale bar of 500 µm. FIG. 7B illustrates the region within the dashed lines of FIG. 7A, with a scale bar of 250 µm. FIG. 7C illustrates the region within the dashed lines of FIG. 7B, with a scale bar of 100 µm.

Without vertical focusing control, a limitation of the voice-coil system 10 at 2 mm and 4 mm the difficulty in achieving UV-PARS scans over the entire 12 mm travel range. Without vertical focusing control, the tip-tilt of both the voice-coil and stepper stage axes may be carefully adjusted to ensure that the sample 18 surface remains within the ~1 µm depth-of-focus (DOF) of the 266 nm excitation beam. Even with methodical alignment of stage axes' tip-tilt, the scanning surface may not be contained to the DOF of the 266 nm beam. This was made apparent by performing tip-tilt adjustment using a reflective sample 18, and then observing the relative change in spot-size of the back-reflected beam when the sample 18 surface is scanned laterally near the beam focus. The inability to perform absolute alignment of the stage systems tip-tilt to the focal plane of the 266 nm beam may be primarily due to the flatness specification of both the stepper and voice-coil stages, specified as ±2 µm and ±6 µm, respectively. The flatness specification is the difference between the maximum and minimum heights of the stage top over the full travel range, and thus may result in the scanning surface moving in and out of the 266 nm DOF over the duration of a scan. This problem is likely exacerbated by sample 18 mounting considerations. For example, if the microscope coverslip 15 is not parallel to the stage-top or if the coverslip 15 is buckled due to tissue compression during sample 18 mounting, this would further limit ability in performing in-focus wide-field UV-PARS scans.

Alongside the present inability to achieve UV-PARS scans over the FTR, the process of tip-tilt alignment may be both time-consuming and require trained personnel for system operation, limitations that may be overcome with the focal height compensation 84 guided by optical profiling (e.g., with OCT-sub-systems) in the present disclosure.

Referring to FIG. 8, a heat-map of the cm2 imaging time as a function of scanning width and frequency is illustrated. The heat-map may be calculated using a measured load-mass of 162 g. Imaging times for 400 nm and 1 µm sampling resolutions are shown on the right-hand side of the graph. The cross-hairs at 2 mm and 4 mm indicate the operating points for the widths and scanning frequencies demonstrated in FIG. 5 and FIGS. 6-7, respectively.

Various Embodiments

To achieve focal height adjustment during scanning so that the entire large scan area is within the depth of focus of the high-resolution microscopy modality, an optical coherence tomography as an optical profiling modality is disclosed. While axial resolution of OCT 82 may be several microns, finer resolution estimates of surface topography are possible with nanometer-scale precision using phase-sensitive OCT 82 processing methods such as cross-correlation tracking methods. Such OCT 82 height profiling may be used to create an axial/height Z-focal compensation control signal during X-Y scanning with a fast voice-coil stage 16A. The focal height actuation may be accomplished using a piezo objective scanner 80 or other dynamic focusing device such as a MEMS (micro-electro-mechanical systems) mirror, liquid lens, etc.

This principle may be adapted to many forms of high-resolution microscopy as illustrated in several embodiments below.

Figure 9A:
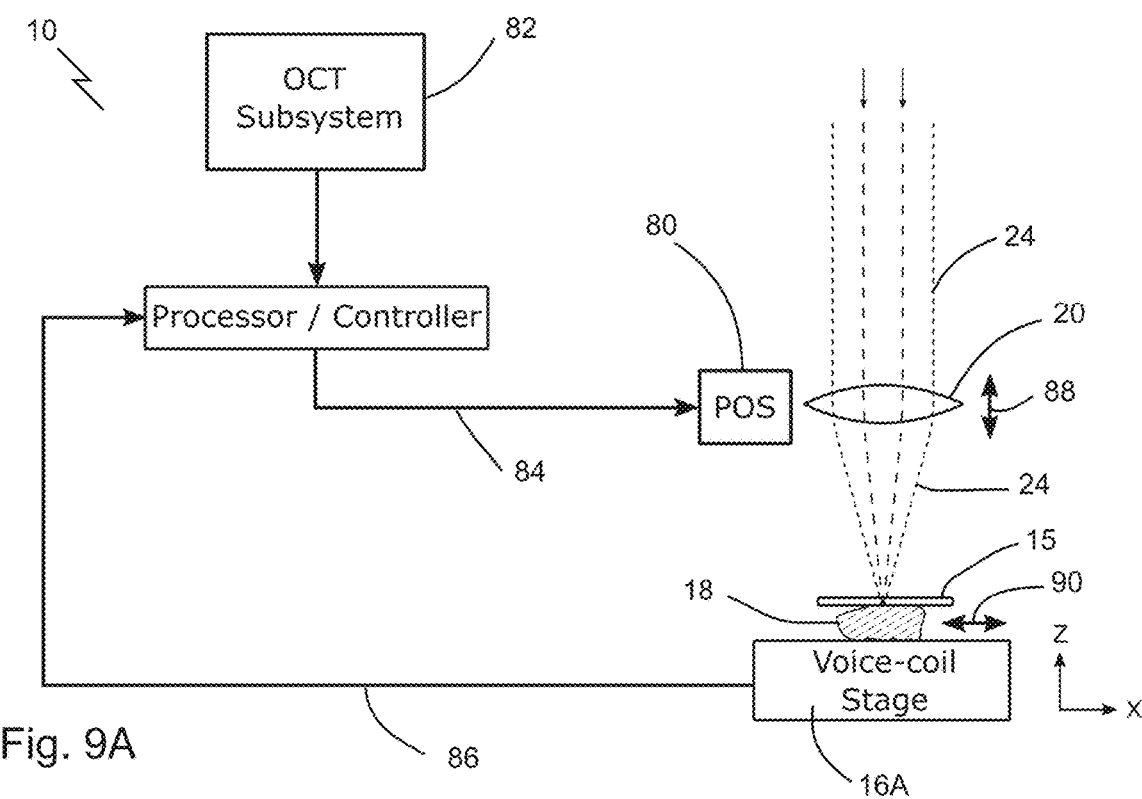
FIG. 9A is a diagram of a combined high-resolution microscopy system with high numerical Aperture (NA) and a low-NA optical coherence tomography system, along with a voice coil stage and vertical height compensation with a piezo objective scanner.
Figure 9B:
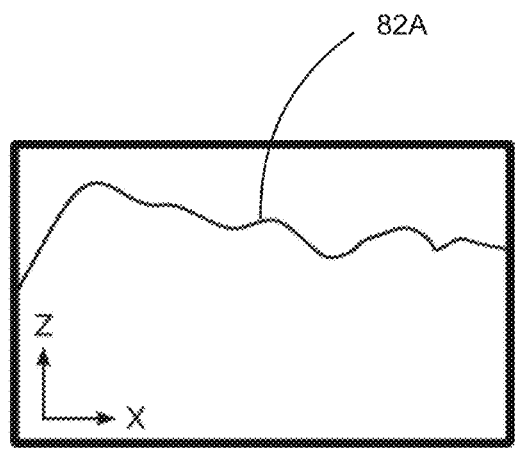
FIG. 9B is a graph of optical coherence tomography profile of FIG. 9A without height compensation.
Figure 9C:
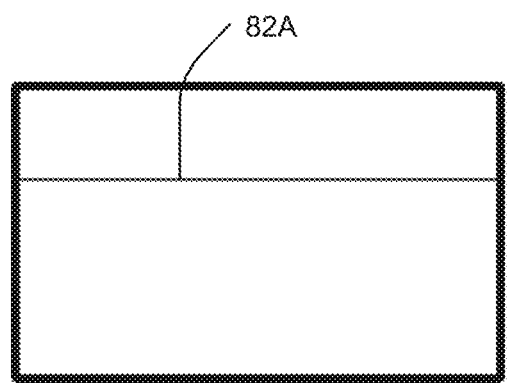
FIG. 9C is a graph of optical coherence tomography profile of FIG. 9A with height compensation.

Referring to FIGS. 9A-C, a combined high-resolution microscopy system 10 with high numerical Aperture (NA) and a low-NA optical coherence tomography (OCT) system 82 is illustrated. The microscopy system 10 may comprise a voice coil stage 16A. The system 10 may comprise a vertical height compensation 84 with a piezo objective scanner 80. Prior to using height compensation 84, an OCT scan 82A may reveal non-flat scanning topography. Vertical height compensation 84, such as axial focal adjustments, during the scan 82A, may achieve an effectively flat surface topography, such that the flatness is within the depth of focus of the high-resolution microscopy system 10. The objective lens 20 may be adjusted to achieve focus, for example along arrow 88. The voice-coil stage 16A may be actuated to achieve focus, for example along arrow 90.

Figure 10:
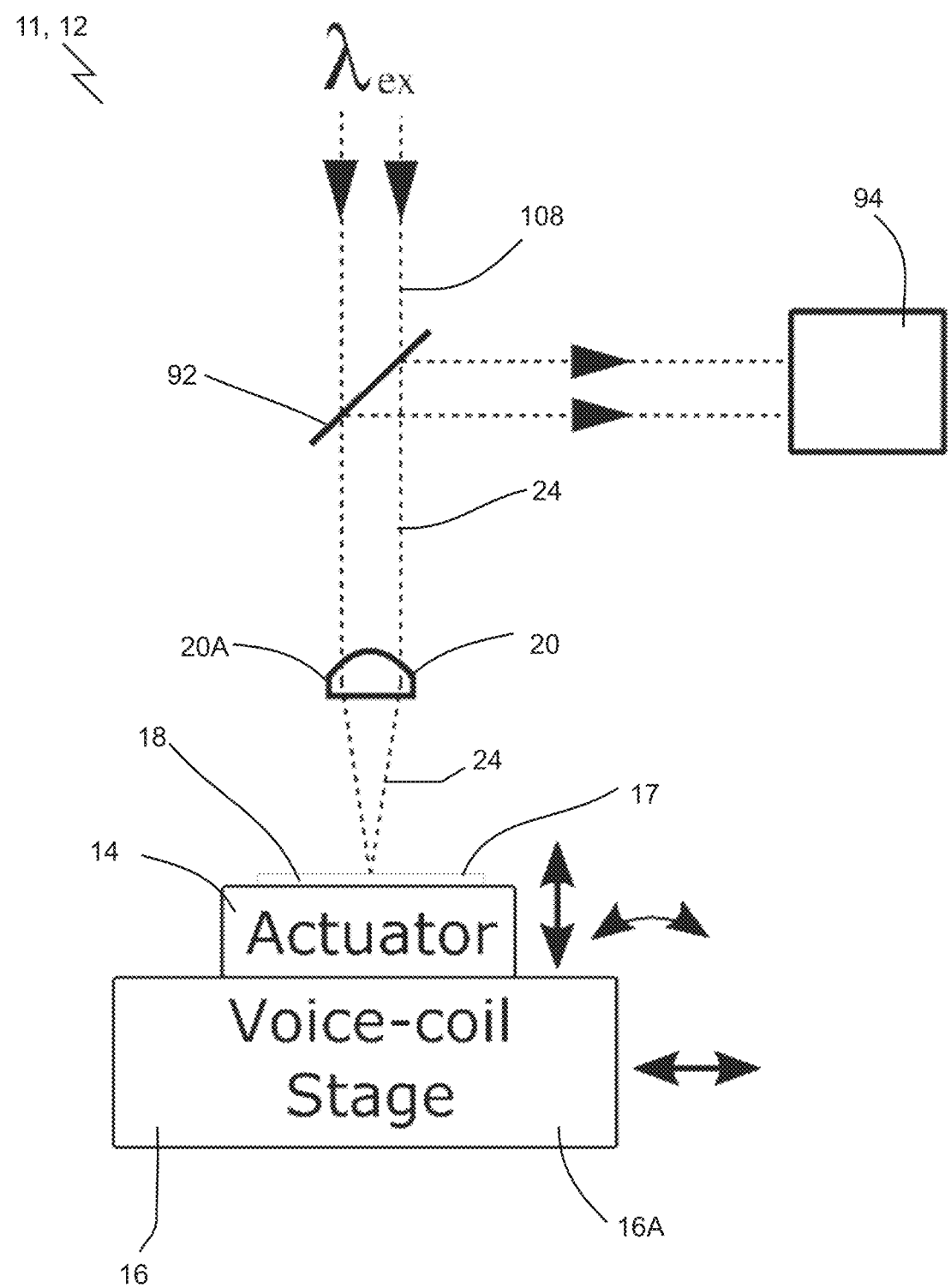
FIG. 10 is a diagram of an embodiment of an optical profiling sub-system and focus-adjust sub-system.

Referring to FIG. 10, an embodiment of an optical profiling sub-system 11 and focus-adjust sub-system 12 is illustrated. The sub-system 12 may comprise an actuator that is configured to compensate an axial focusing position relative to the surface of the sample at different scanning positions by in use adjusting the sample or an optical focusing location of the optics to ensure the sample stays within a depth of focus from the focal point of the high-resolution microscopy system and so that the optical focusing location is no deeper than a threshold penetration depth. The optical profiling sub-system 11 may be configured to sense, for example measure, height variations of the sample 18 at different scanning positions. The optical profiling sub-system 11 may comprise one or more of an interferometer, a confocal aperture, a focus and phase detection sub-system 12 that may be configured to project a pattern onto an optical image, and a Shack-Hartman wavefront sensor 94. The optical profiling sub-system 11 may comprise one or more of a camera system, an optical coherence tomography system 82 or a processor that is configured to execute an algorithm to estimate the height variations from the interferometer. The processor may be used to extract information for example including mean intensity, peak intensity, lifetime, optical redox ratios, or optical absorption of the signals. The interferometer may be configured so that one or more of the two or more light sources source for the interferometer.

Referring to FIG. 10, the system may comprise a focus-adjust sub-system 12. The focus-adjust sub-system 12 may comprise an actuator 14. The actuator 14 may be configured to compensate an axial focusing position relative to the surface of the sample 18 at different scanning positions by in use adjusting the sample or an optical focusing location of the optics to ensure the sample stays within a depth of focus of the high-resolution microscopy system and so that the optical focusing location is no deeper than a threshold penetration depth. The focus-adjust sub-system 12 may be configured such that the threshold penetration depth is set at a suitable level, such as no deeper than 2 millimeters or 3 times a 1/e penetration depth of the fast scanning wide-area high-resolution microscope system, whichever is less.

Referring to FIG. 10, at least one of the two or more light sources may provide a source of light for an optical profiling sub-system 11 configured to measure height variations of the sample 18 at different scanning positions. The reflected beam image of excitation light 108 may be captured by a camera or Shack-Hartman wavefront sensor 94. If the captured excitation light 108 beam size or wavefront curvature changes during the scan it may mean the sample 18 height is not uniform or the tip-tilt of the sample 18 is not adequately level. The focus-adjust sub-system may comprise one or more of a piezo-actuator, a goniometer; a voice coil actuator 14, a vari-focal lens, a tip-tilt adjuster; a manual micro-positioner; or a micro-electro-mechanical system (MEMS) deformable mirror. The actuator 14 may be capable of scanning loads greater than 5 grams, at more than 1 mm distances, at greater than 10 Hz. The actuator 14 may be capable of rotating a mirror more than 1-degree at greater than 100 Hz. The actuator 14 may be configured to adjust the height or tip-tilt of the fast-scanning system. The controller and actuator 14 may adjust the tip-tilt and/or sample 18 height. The controller and actuator 14 may potentially adjust dynamically as the sample 18 is scanned by the voice-coil stage 16A. The controller may be configured to control the scanning system and to render images from photodetector data. Note that other wavelengths may be present but are not shown for clarity. In general, the controller may be configured to control the scanning system and to render images from photodetector data.

Figures 11A, 11B:
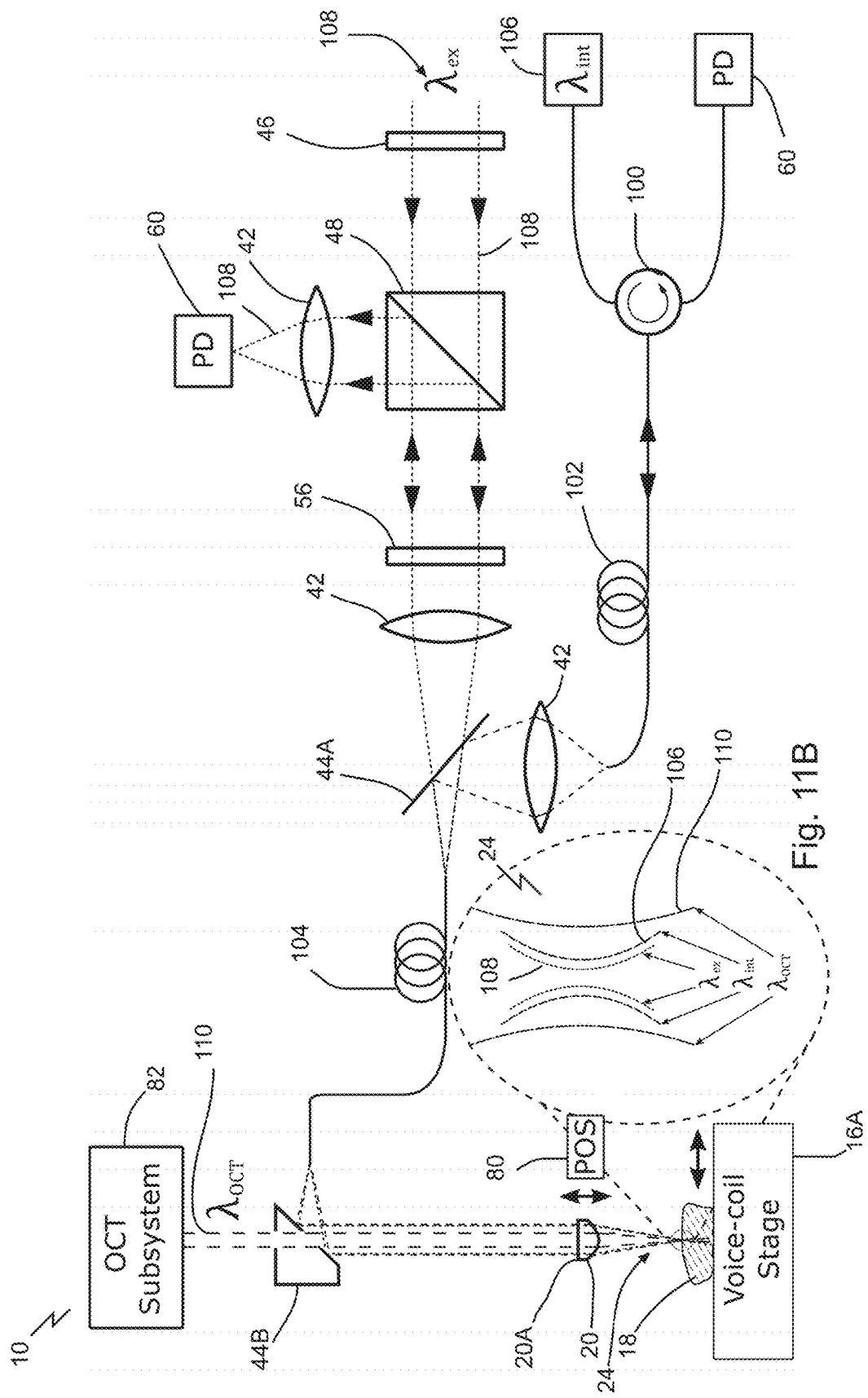
FIG. 11A is a diagram of an embodiment of a system for widefield fast-scanning microscopy.
FIG. 11B is an enlarged diagram of the area defined by the dashed circular lines in FIG. 11A.

Referring to FIGS. 11A-B, a system 10 for widefield fast-scanning microscopy is illustrated. In an embodiment of the system 10 photoacoustic remote sensing microscopy may be used. A structured single mode fiber may be configured to convey one or more of: incident light from the two or more incident light sources; or emission or scattered light from a sample. For example an endlessly single mode fiber 104 may be configured to convey one or more of excitation or additional light from the two or more light sources or emission or scattered light from a sample. Excitation and interrogation light 108 and 106, respectively, may be combined into a polarization-maintaining endlessly single mode fiber 104 (PM-ESM). The endlessly single mode fiber 104 may comprise one or more of anti-resonant silica hollow-core fibers (shown in the diagram), fused silica materials, a photonic crystal fiber, gas filled hollow-core structures, or similar fiber may be used. The output from the PM-ESM 104 may be collimated by a reflective collimator or off-axis parabolic mirror 44B. An achromatic focusing element configured to focus the incident light from the two or more incident light sources onto the sample. Combining optics, such as mirror 44A may be configured to combine the excitation 108 or additional light, in some cases such that a beam waist of the excitation 108 sources is narrower than a beam waist of at least one other of the two or more light sources. A separator may be configured to collect one or more of: light scattered from one or more of the two or more incident light sources; or light emitted from the sample. A parabolic mirror 44B may contain a through-hole for delivery of an NIR beam 110 for optical coherence tomography 82 (OCT), which may be associated with a separate sub-system for example an optical profiling system 11 or a focus-adjust sub-system 12. The OCT 82 sub-system may include time-domain, spectral-domain or swept source architectures. Combined collimated light may be co-focused using a high-NA refractive objective 20 or aspheric lens 20A and may form beam 24. A scanning system may be configured to scan one or more of the optics, light from the two or more incident light sources, or the sample.

Figures 12A, 12B:
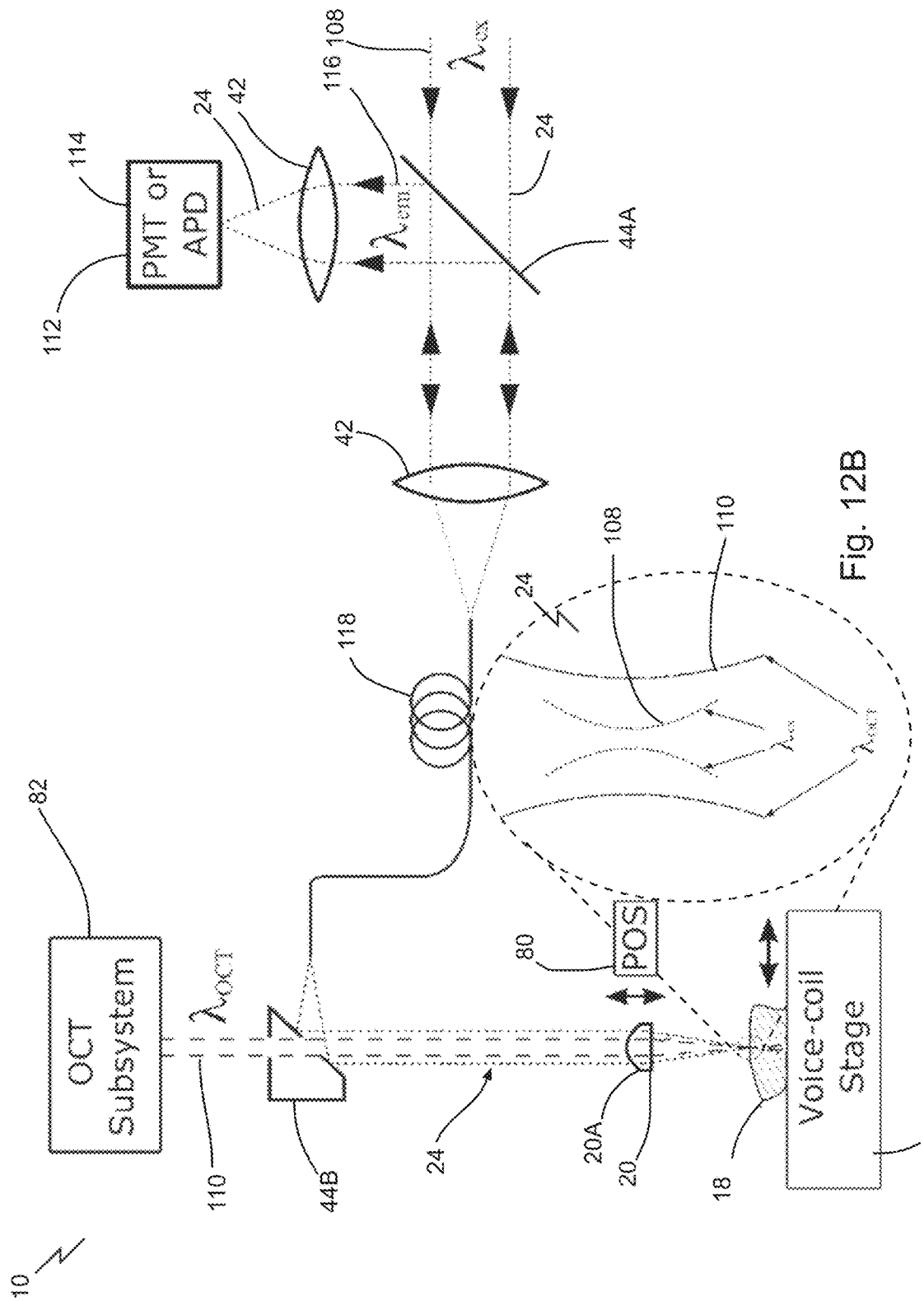
FIG. 12A is a diagram of an embodiment of a system for widefield fast-scanning confocal fluorescence microscopy.
FIG. 12B is an enlarged diagram of the area defined by the dashed circular lines in FIG. 12A.

Referring to FIGS. 12A-B, a system 10 for widefield fast-scanning confocal fluorescence microscopy is illustrated. A Large Mode Area Endlessly Single Mode Fiber 118 (LMA-LSM) may be used to both convey excitation light and returning fluorescence emission through the fiber 118 while maintaining single mode performance at all wavelengths, which may be important for achieving optimal confocal sectioning performance. Combination of the LMA-LSM 118 with an Optical Coherence Tomography 82 sub-system, voice-coil scanning 13 and objective-scanner-based height compensation 84 may lead to ultrahigh resolution confocal microscopy images over a widefield at high imaging rates.

Figures 13A, 13B:
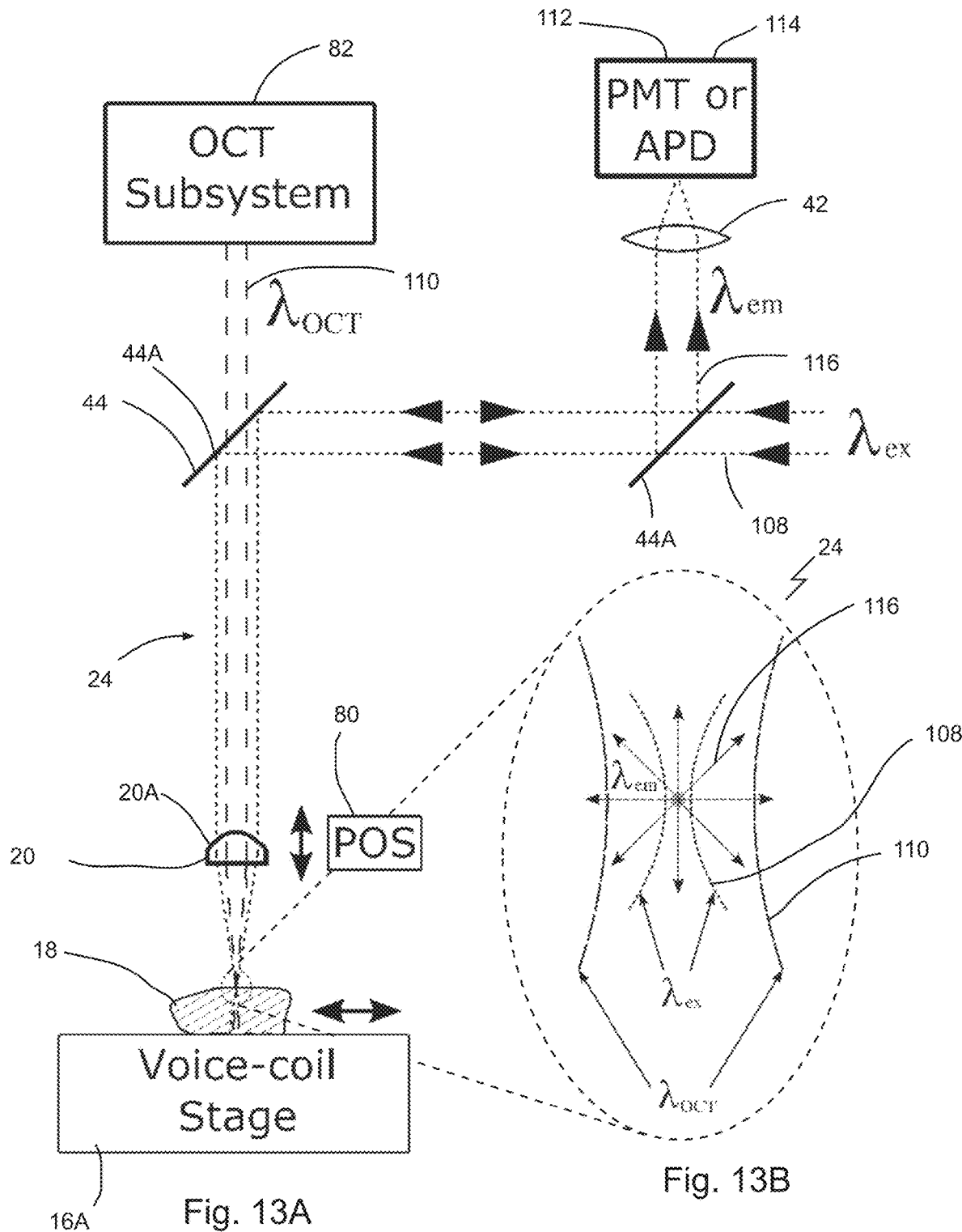
FIG. 13A is a diagram of an embodiment of a disclosed system for widefield fast-scanning multi-photon fluorescence microscopy.
FIG. 13B is an enlarged diagram of the area defined by the dashed circular lines in FIG. 13A.

Referring to FIGS. 13A-B, a system 10 for widefield fast-scanning multi-photon fluorescence microscopy is illustrated. Fiber transmission is not shown but may be used. Combination with an Optical Coherence Tomography 82 sub-system, voice-coil scanning 13 and objective-scanner-based height compensation 84 may lead to ultrahigh resolution nonlinear microscopy images over a widefield at high imaging rates.

Figure 14A:
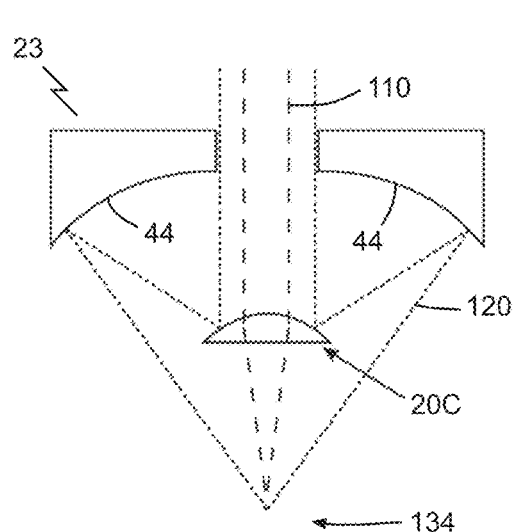
FIG. 14A is a diagram of a modified reflective objective.
Figure 14B:
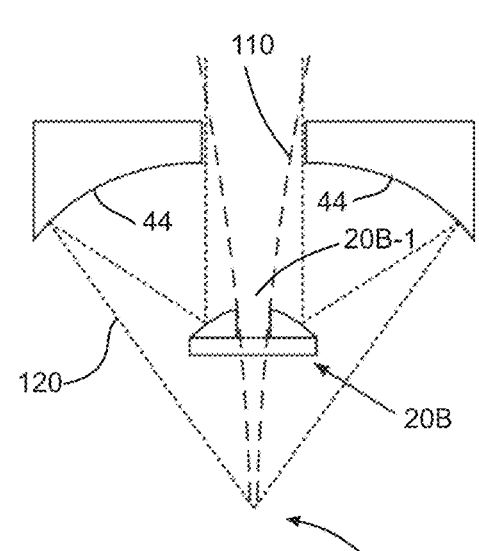
FIG. 14B is a diagram view of a second modified reflective objective lens.
Figure 14C:
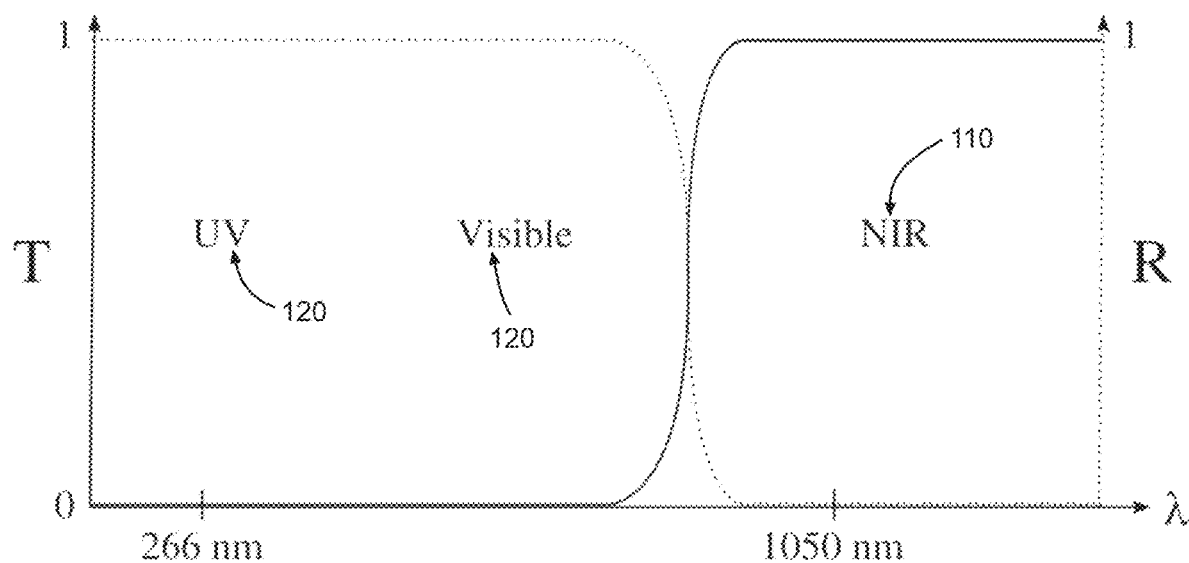
FIG. 14C is a graph depicting presence of different light sources on the electromagnetic spectrum.

Referring to FIGS. 14A-C, a modified reflective objective 23 design is disclosed and analyzed. The system 10 may comprise a focusing element, such as a modified reflective objective 23. A secondary mirror 20B may be replaced with a lens 20C having a dichroic mirror coating to enable the light for optical coherence tomography to pass through and be focused with low numerical aperture, while other wavelengths are reflected and focused by the reflective objective with high numerical aperture. The modified reflective objective 23 may comprise a primary reflective curved mirror 44 surface configured to focus light, for example to focus the light with diffraction-limited performance without chromatic aberrations and that comprises a through-hole 20B-1. The modified reflective objective 23 may comprise a curved reflective or partially reflective secondary mirror 20B surface. The material of the secondary mirror 20B may permit one or more of reflection of a first set of wavelengths or transmission of a secondary set of wavelengths. The modified reflective objective lens 23 may be configured to accept collimated or diverging light through the through-hole 20B-1 in the primary reflective curved mirror 44 surface, reflect from the curved reflective or partially reflective secondary mirror surface 20B, and then reflect from the primary reflective curved mirror 44 surface and focus light with diffraction-limited performance without chromatic aberrations. The modified reflective objective 23 may comprise a dichroic mirror coated lens 20C rather than purely reflective secondary mirror 44. The dichroic mirror coated lens 20C may allow the NIR beam 110 for OCT 82 to be transmitted and focused with low-NA, while other UV and/or visible wavelengths 120 may be reflected and focused with high-NA. The dichroic mirror coated lens 20C design may allow for elimination of chromatic or spherical aberrations in focusing the UV/visible light 120 and may achieve near diffraction-limited focusing of a wide range of wavelengths at the same focal position 134. Misalignment of the OCT beam 110 focus with the UV/visible light 120 focus may be tolerable, as long as the UV/visible light 120 focus is within the depth of focus of the OCT beam 110, which is a determinant of the depth range. Alternatively, instead of a dichroic mirror coating 20C, a conventional secondary reflective mirror 20B may be used with a through-hole 20B-1, optionally with an optical window, optionally with dichroic coatings. The through-hole 20B-1 in the curved reflective or partially reflective secondary mirror surface 20B may define a radius no larger than a radius at which light from the curved reflective or partially reflective secondary mirror surface 20B is reflected onto the primary reflective curved mirror 44 surface. Alternatively, the secondary mirror 20B may be comprised of a very thin layer of metal or be comprised of a material, for example silicon, which may allow NIR beam 110 transmission but not UV/visible light 120 transmission. The modified reflective lens 23 may comprise one or more of an optical focusing element (such as lens 20), a transmissive element, a dichroic mirror, or a filter. The modified reflective objective 23 may be used to image a sample 18.

Referring to FIGS. 15A-B, a system 10 for widefield fast-scanning stimulated Raman Scattering (SRS) or Coherent Anti-Stokes Raman (CARS) microscopy is illustrated. An endlessly single mode fiber 104 (ESM) may guide synchronized ultrafast laser pulses 122 for excitation of the target. The system 10 may comprise detection optics, such as lens 20, splitter 44B, lens 42, and splitter 44A, which may be configured to collect light from the sample. The detection optics may be configured to co-focus detected wavelengths with minimal or no chromatic aberration throughout the scan so as to ensure focal volume overlap for each detected wavelength, a focal volume for a given wavelength defined through the principle of reciprocity by a surface where the effective focal intensity drops to a pre-defined fractional threshold relative to the focal maximum, the threshold being greater than 0.1. Refocusing optics may be configured to refocus scattered or emitted light from the sample 18 back into an endlessly single mode fiber 104 for confocal operation over multiple wavelengths. The Raman-scattered light may be collected back through the ESM 104 or may be collected prior to entering the ESM 104 using a dichroic mirror 44A. Detection may be accomplished by an Avalanche Photodiode 114 (APD) or a Photomultiplier Tube 112 (PMT). Synchronized laser pulses may be accomplished with synchronization electronics 124 controlling two lasers 122A. Synchronized laser pulses may be accomplished by using a single pump source and wavelength converting optics plus pathlength control (not shown for simplicity). Combination with an Optical Coherence Tomography 82 sub-system, voice-coil scanning 13 and objective-scanner-based height compensation 84 may lead to ultrahigh resolution nonlinear microscopy images over a widefield at high imaging rates. Optional filter sets may also be used.

Figure 16:
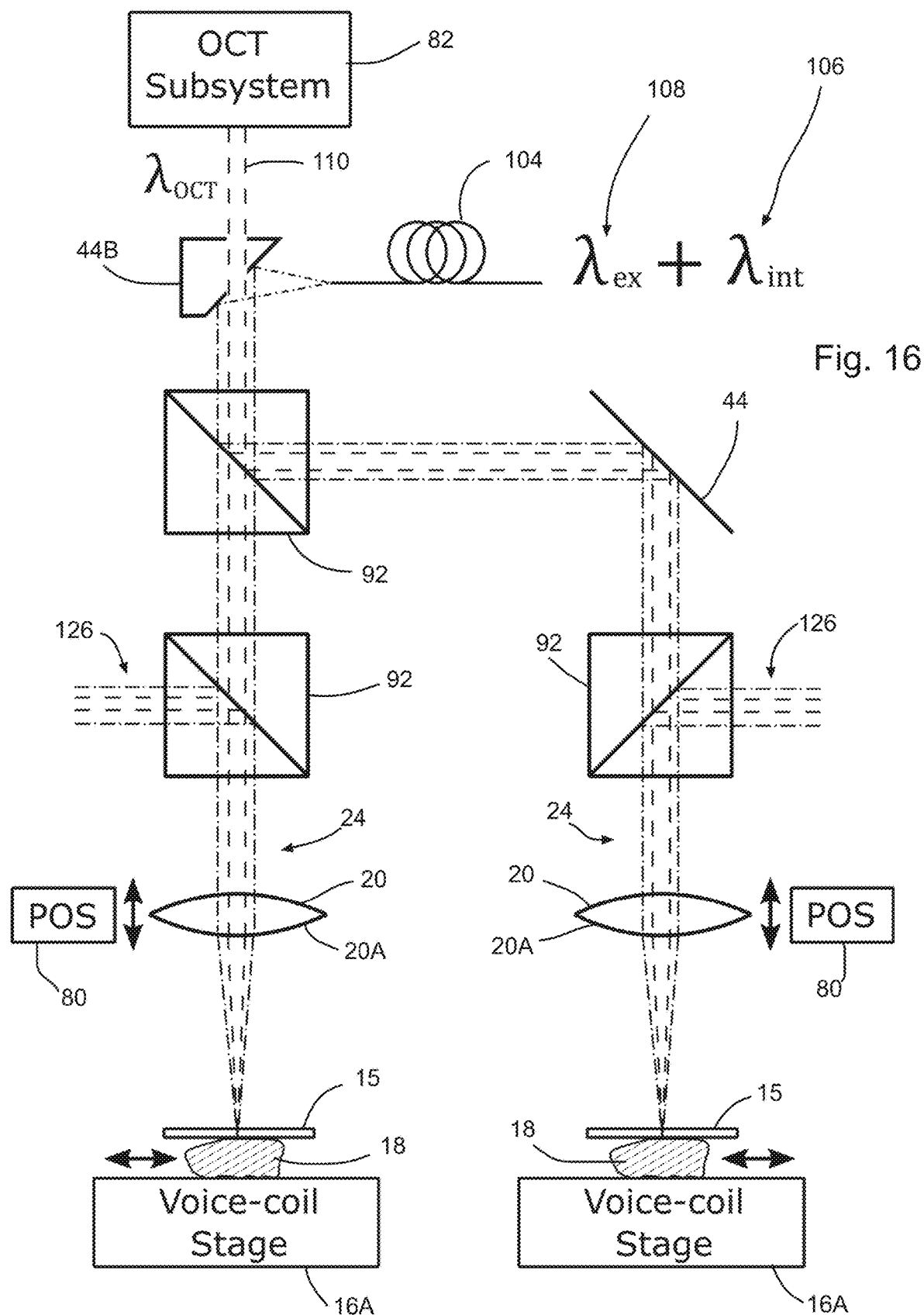
FIG. 16 is a diagram of an embodiment of a system for Photoacoustic Remote Sensing with fast voice coil stages (VCS) and piezo objective scanners (POS) for scanning multiple tissue samples in parallel.

Referring to FIG. 16, a parallelized embodiment of Photoacoustic Remote Sensing with fast voice coil stages 16A (VCS) and piezo objective scanners 80 (POS) for scanning multiple tissue samples 18 in parallel is illustrated. The system 10 may be configured to create multiple co-focused light spots interrogating plural regions of one or more samples 18 (two being shown in the example). An Endlessly Single Mode fiber 104 (ESM) may guide excitation and interrogation light 108 and 106, respectively, which may be collimated with a reflective collimator or off-axis parabolic mirror 44B. A through-hole in the parabolic mirror 44B may enable passage of an NIR beam 110 for OCT 82. The system 10 may comprise optics, such as splitter 92, configured to split the combined delivered light into different paths, each path having its own focusing optics. The combined beams of NIR 110, excitation light 108 and interrogation light 106 may be split with a beam-splitter 92 and redirected to respective paths with mirrors 44. The different OCT paths may be sequentially addressed with optional electronic shutters or by using a motor to adjust the reference mirror in the OCT interferometer to match the pathlength of interest.

Figure 17:
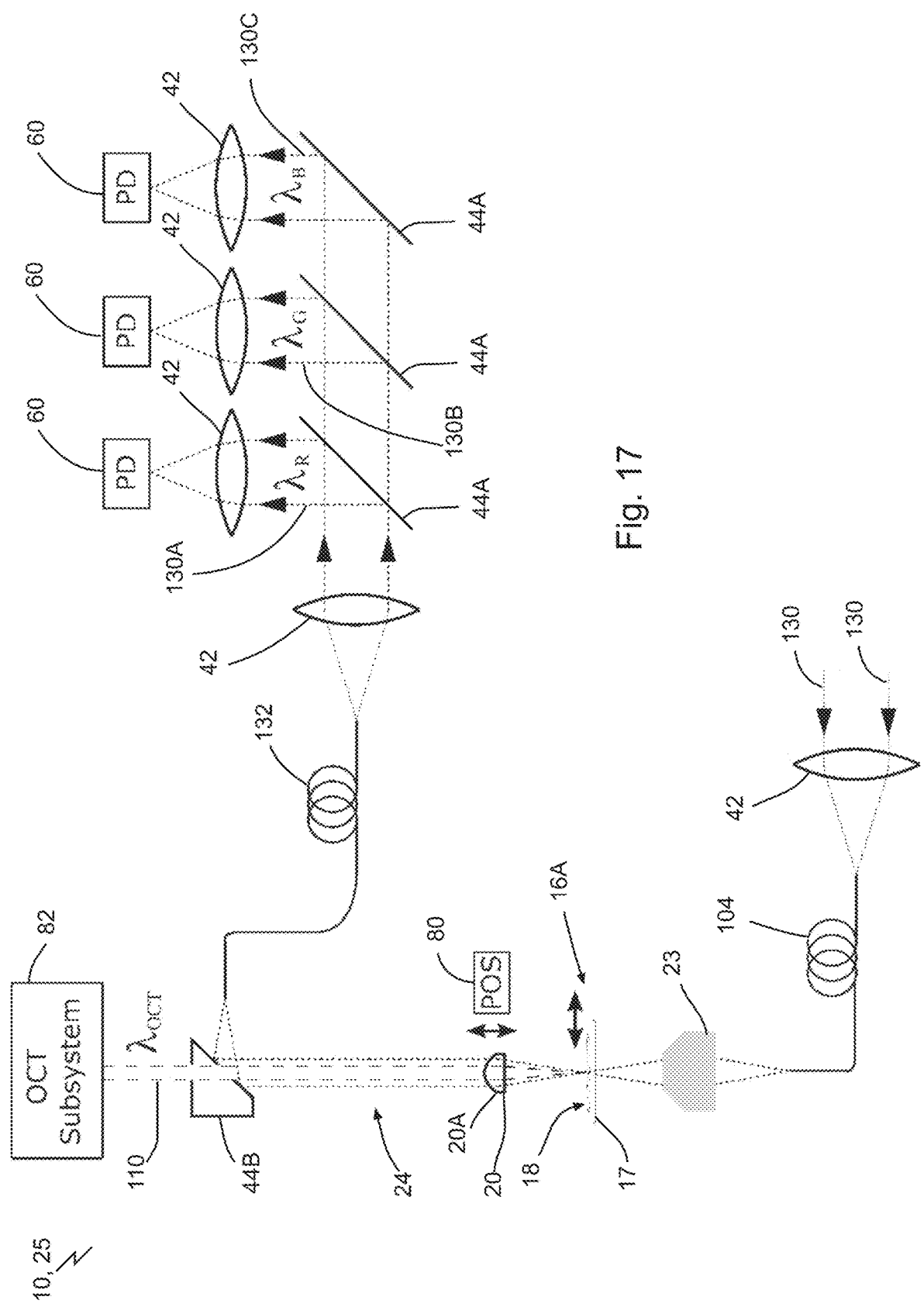
FIG. 17 is a diagram of an embodiment of a system for a Whole Slide Imager.

Referring to FIG. 17 an embodiment of Whole Slide Imager system 25 is illustrated. The Whole Slide Imager system 25 may scan the slides 17 with ultrahigh resolution. The Whole Slide Imager system 25 may comprise a white light source 130, for example a super-continuum source or red-green-blue source. The white light source 130 may be coupled through a fiber such as an endlessly single mode fiber 104 (or highly nonlinear fiber for super-continuum generation) and may be focused through a slide 17 in a transmission configuration. A focusing element, for example a parabolic mirror 44B, may collect the light, which may be separated into bands such as red-green-blue bands 130A, 130B and 130C, respectively. The light may be conveyed from the parabolic mirror 44B by a fiber, for example a multi-mode fiber 132. The red-green-blue bands 130A, 130B and 130C, respectively may be detected with photodetectors 60. A voice-coil (VC) stage 16A may move the slide 17 in at least of the X-Y directions. Another actuator 14 such as a stepper motor (not shown) of the stepper stage 16C may be used for the translation in the other direction. A focal-position system such as a piezo objective scanner 80 (POS) may be used for Z-axis focal translation. An OCT 82 sub-system may be used on either side of the slide 17 to record the sample 18 height as it is translated and the height data may be used by a controller to drive the piezo-objective scanner 80. The fast-scanning multi-wavelength microscope system may be used to image a sample 18.

Figure 18A:
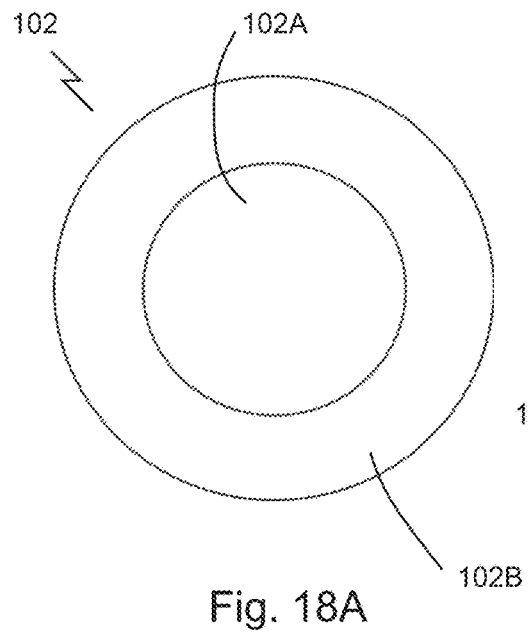
FIG. 18A is a cross sectional view of a Conventional Step-Index Fiber.
Figure 18B:
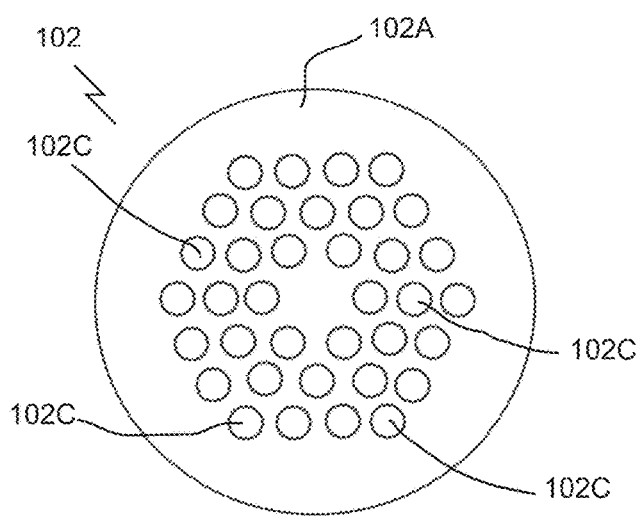
FIG. 18B is a cross sectional view of a Solid-core Photonic Crystal Fiber.
Figure 18C:
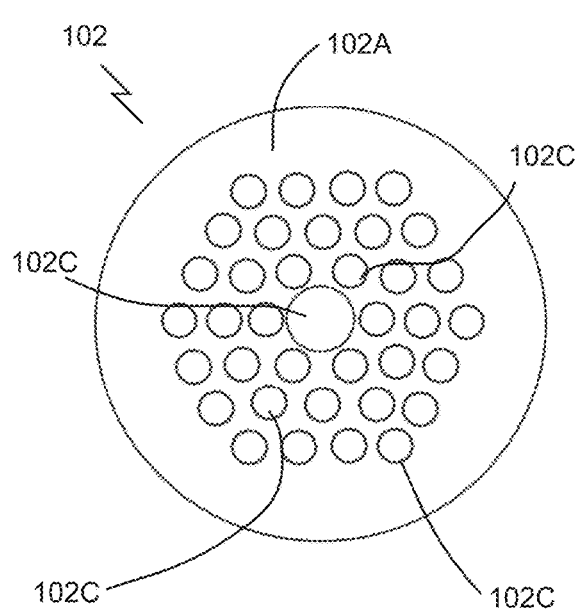
FIG. 18C is a cross sectional view of a Hollow-core Photonic Crystal Fiber.
Figure 18D:
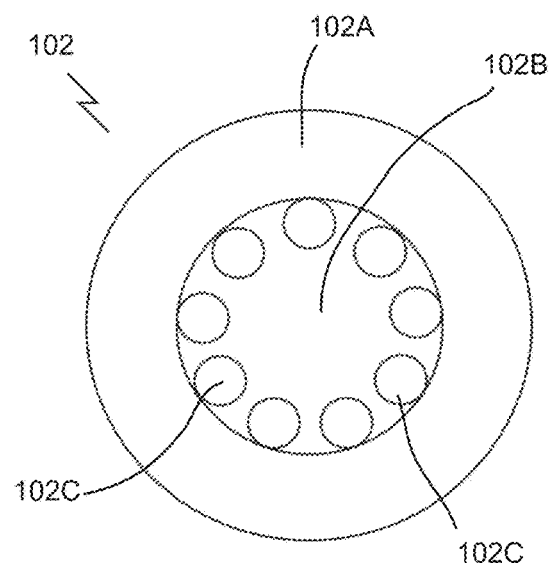
FIG. 18D is a cross sectional view of an Anti-resonant Hollow-core Photonic Crystal Fiber.

Referring to FIGS. 18A-D, illustrations are provided of different compositions of structured single mode fibers 102. The fiber may comprise one or more of an endlessly single-mode fiber; anti-resonant silica hollow-core fibers; a revolver hollow-core fiber; fused silica materials; a single-mode fiber; a photonic crystal fiber; or gas or liquid filled hollow-core structures. A single mode fiber 102 may comprise one of a variety of suitable cross-sectional architectures. For example, a single mode fiber 103 may comprise one or more of a silica or fused silica 102A, a cladding material 102B and hollow passages 102C, which may contain air. The cross-sectional architectures shown include a conventional step-index fiber (FIG. 18A), a solid-core photonic crystal fiber (FIG. 18B), a hollow-core photonic crystal fiber (FIG. 18C), and an anti-resonant hollow-core photonic crystal fiber (FIG. 18D).

Figure 20:
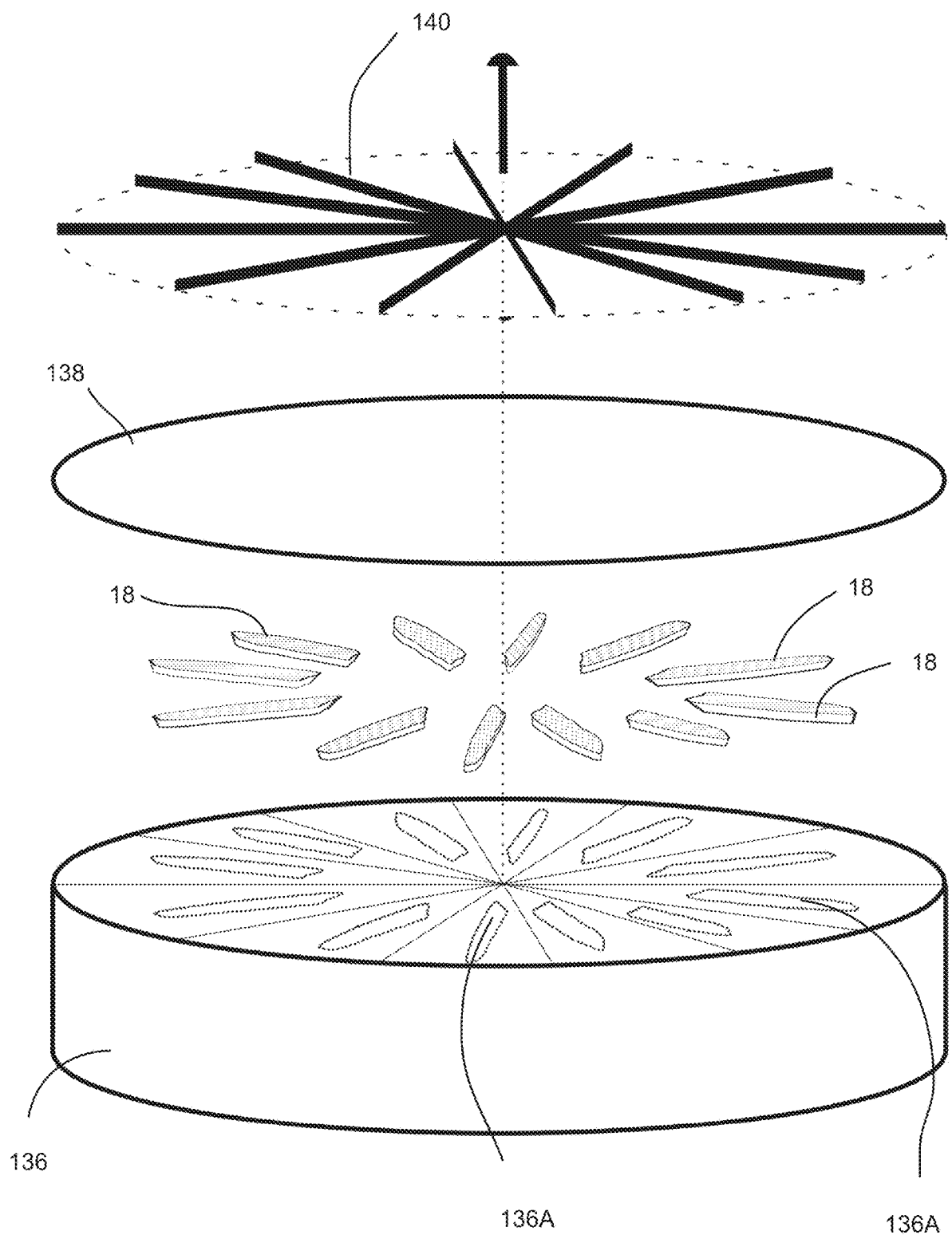
FIG. 20 is an exploded view of the Rotational Stage Mechanism of FIG. 19.

Referring to FIGS. 19 and 20 illustrate a microscopy platform for multiple tissue sample 18 imaging with a rotational stage 136 mechanism. Excitation light 108 and optionally interrogation light 106 and/or light for optical coherence tomography 110 or other optical profiling sub-system 82 are incident on samples 18 in the displayed structure. The samples 18 may be mounted on a rotating stage 136. The samples 18 may be secured to the rotating stage 136 in a suitable fashion, for example the sample 18 may be placed in slots 136A. A glass or other transparent plate 138 may be placed on top of the samples 18, further mounting the sample 18 to the rotational stage 136. A structural clamp 140 may be used to ensure even pressure across the glass plate 138 without obstructing light passage.

Scattered and emitted light may be collected by the imaging system 10 as the stage 136 rotates the samples 18. Another actuator, not shown, may move the focus in the radial direction of the stage 136. An additional actuator, such as a piezo objective scanner, not shown, may translate the objective lens 20 or achromatic lens (OL/AL) to maintain optimal focusing as the stage 136 rotates.

Figure 21:
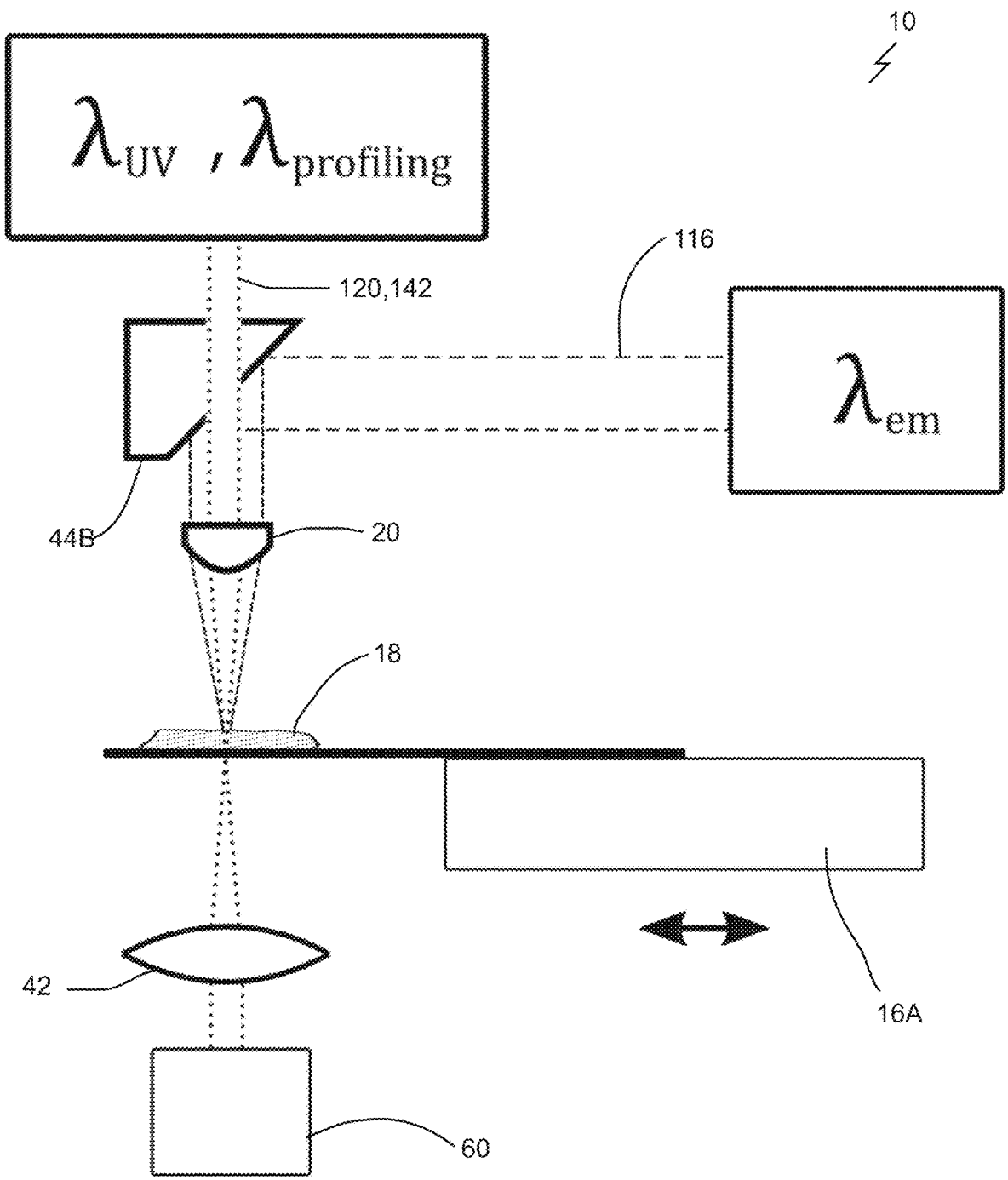
FIG. 21 is a diagram of an embodiment of a system for Ultraviolet Transmittance with Voicecoil Fast Scanning.

Referring to FIG. 21 a fast-scanning whole slide imaging system 10 is illustrated. The system 10 may comprise additional separators and photodetectors used to collect light associated with one or more suitable effects, such as endogenous nicotinamide adenine dinucleotide+hydrogen (NADH) emission; flavin adenine dinucleotide (FAD) emission; collagen emission; exogenous fluorophore emission; scattering from incident sources; or information related to optical absorption. The system 10 may be structured to enable transmission-based absorption imaging of thin samples 18 along with collection of fluorescent or autofluorescent emission from the samples 18 (shown here in reflection mode). Collection of scattered light may be possible. Incident light may be focused with a suitable lens such as an objective lens 20 or achromatic lens (OL/AL) and may be refocused for transmission detection with additional lenses 42. A photodetector 60 (PD) may be used to detect transmitted light and emitted light from the sample 18. An optical profiling source may additionally be used to sense the height variations of the sample 18 during scanning and an actuator (not shown) can be used to adjust the focal position to ensure optimal focusing in the sample 18.

The system and methods of this disclosure may be applicable to multiple forms of microscopy which involve a scanned focal spot, including reflection mode microscopy (including laser scanning fluorescence microscopy), confocal fluorescence or scattering microscopy (incorporating a pinhole in the detection path for optical sectioning), multiphoton or other nonlinear microscopies (relying on nonlinear harmonic generation from a single source, sum-frequency, difference frequency or other mixing effects from multiple high peak power sources), transmission mode microscopy (involving transmission of light through a sample with the source path and detection path on opposing sides of the sample), stimulated Raman Scattering Microscopy, Coherent Anti-Stokes Raman Microscopy, optical coherence tomography (comprising a Michelson or other interferometer and either a swept source or low-coherence source, and an optical detector, which could be a spectrometer and camera in the case of frequency domain optical coherence tomography) and photoacoustic remote sensing microscopy (comprising a pulsed excitation source and continuous wave interrogation source, both co-focused and co-scanned, modulations in the backscattered interrogation source used by a processor to generate an image representing optical absorption).

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A fast scanning wide-area high-resolution microscope system comprising:
   one or more fast scanning sub-systems configured for sample scanning or optical beam scanning, at least one of the one or more fast scanning sub-systems employing mechanical scanning of a sample, and capable of peak scanning velocity of 0.5 meters per second and capable of 10 Hz or greater scanning frequency;
   one or more position feedback systems configured to track the position of the one or more fast scanning systems;
   two or more incident light sources, one of which is an ultraviolet source;
   stationary achromatic focusing optics configured to focus the two or more incident light sources onto a sample with overlap of the two or more focal spots from each of the two or more incident light sources;
   at least one of the two or more focal spots focused to a spot size of less than 500 nm;
   detection optics comprising an achromatic focusing element configured to collect light scattered, reflected, transmitted, or emitted from the sample, and configured to provide sensitivity to ultraviolet absorption in the sample, the detection optics further comprising a spectral separator;
   one or more photodetectors;
   a data acquisition system;
   a control system;
   an optical profiling sub-system configured to sense height variations of the sample at different scanning positions;
   a focus-adjust sub-system comprising an actuator that is configured to compensate an axial focusing position relative to the surface of the sample at different scanning positions by in use adjusting the sample to ensure the sample stays within a depth of focus of the ultraviolet source from the focal point of the high-resolution microscopy system and so that the difference in optical focusing location is no deeper than a threshold penetration depth;
   a processor configured to generate images of the sample, the images providing ultraviolet absorption contrast; and
   a modified reflective microscope objective lens integrated as the achromatic focusing element, in which the modified reflective microscope objective lens comprises:
      a primary reflective curved mirror surface configured to focus light with diffraction-limited performance without chromatic aberrations and that comprises a through-hole; and
      a curved reflective or partially reflective secondary mirror surface that has a material that one or more of:
         permits reflection of a first set of wavelengths;
         permits transmission of a secondary set of wavelengths; or
         comprises a through-hole; and
      in which the modified reflective objective lens is configured to accept collimated or diverging light through the through-hole in the primary reflective curved mirror surface, reflect from the curved reflective or partially reflective secondary mirror surface, and then reflect from the primary reflective curved mirror surface and focus light with diffraction-limited performance without chromatic aberrations; and
      the through-hole in the curved reflective or partially reflective secondary mirror surface such that it defines a radius no larger than a radius at which light from the curved reflective or partially reflective secondary mirror surface is reflected onto the primary reflective curved mirror surface.

2. The fast scanning wide-area high-resolution microscope system of claim 1 in which at least one of the two or more incident light sources is configured to define one or more of:
   a diffraction-limited focal waist;
   a minimum focal waist of less than 0.5 microns;
   a focal waist of less than 1 micron; or
   a focal waist of less than 5 microns throughout a scan.

3. The fast scanning wide-area high-resolution microscope system of claim 1 in which the focus-adjust sub-system is configured such that the threshold penetration depth is no deeper than 2 millimeters or 3 times a 1/e penetration depth of the fast scanning wide-area high-resolution microscope system, whichever is less.

4. The fast scanning wide-area high-resolution microscope system of claim 1 further comprising one or more of:
   a voice coil actuator;
   a rotating gantry;
   a spinning disk;
   a galvanometer scanning mirror system; or
   a polygon scanning mirror system.

5. The fast scanning wide-area high-resolution microscope system of claim 1 in which the optical profiling sub-system comprises one or more of:
   a photodetector;
   an interferometer;
   a confocal aperture;
   a focal analysis, focus adjustment, or auto-focusing sub-system;
   a focus and phase detection sub-system that is configured to project a pattern onto an optical image;
   a Shack-Hartman wavefront sensor;
   a camera system;
   an optical coherence tomography system; or
   a processor that is configured to execute an algorithm to sense or estimate the height variations or to find the optimal focusing position.

6. The fast scanning wide-area high-resolution microscope system of claim 1 in which the focus-adjust sub-system comprises one or more of:
   a piezo-actuator;
   a voice coil actuator;
   a goniometer;
   a tip-tilt adjuster;
   a manual micro-positioner;
   a vari-focal lens; or
   a micro-electro-mechanical system (MEMS) deformable mirror.

7. The fast scanning wide-area high-resolution microscope system of claim 1 in which additional separators and photodetectors are used to collect light associated with one or more of:
   endogenous fluorophore emission, including from but not limited to nicotinamide adenine dinucleotide+hydrogen (NADH) emission;
   flavin adenine dinucleotide (FAD) emission;
   collagen emission;
   exogenous fluorophore emission;
   scattering from incident sources; or
   information related to optical absorption.

8. The fast scanning wide-area high-resolution microscope system of claim 1 in which a processor is further used to extract information including mean intensity, peak intensity, lifetime, optical redox ratios, or optical absorption of the signals.

9. The fast scanning wide-area high-resolution microscope system of claim 1 in which the fast-scanning sub-system is one or more of:
   capable of scanning at oscillation frequencies greater than:
      20 Hz;
      25 Hz;
      50 Hz; or
      75 Hz; or
   capable of scanning with peak speeds greater than:
      1 m/s; or
      5 m/s.

10. The fast scanning wide-area high-resolution microscope system of claim 1 in which the position feedback system comprises one or more of:
    a digital quadrature encoder;
    an optical encoder; or
    a linear variable differential transformer.

11. The fast scanning wide-area high-resolution microscope system of claim 1 configured to create multiple co-focused light spots interrogating plural regions of one or more samples.

12. The fast scanning wide-area high-resolution microscope system of claim 1 in which the optics further comprise one or more of:
    a reflective objective to minimize chromatic focusing aberrations;
    a modified reflective objective, the modified reflective objective comprising:
       a through-hole in both primary and secondary mirrors; or
       a dichroic element to allow some wavelengths to pass through the optical axis of the modified reflective objective.

13. A method comprising operating the fast-scanning multi-wavelength microscope system of claim 1 to image a sample.

14. A fast-scanning multi-wavelength microscope system comprising: two or more incident light sources, each configured to produce a distinct spectral content, at least one of which being an ultraviolet excitation source for high-resolution microscopy;
    a structured ultraviolet-compatible fiber that maintains substantially single-mode operation at the two or more incident light source wavelengths;
    the structured ultraviolet-compatible fiber being configured to convey one or more of:
       incident light from the two or more incident light sources; or
       emission or scattered light from a sample;
    an achromatic focusing element configured to focus the incident light from the two or more incident light sources onto the sample such that there is overlap of focal volumes of the two or more incident light sources;
    a separator configured to collect one or more of:
       light scattered from one or more of the two or more incident light sources; or
       light emitted from the sample;
    one or more photodetectors;
    a scanning system configured to scan one or more of the optics, light from the two or more incident light sources, or the sample;
    a controller configured to control the scanning system and to render images from photodetector data;
    a processor configured to generate one or more images of the sample, and detect modulations of backscattered due to ultraviolet absorption;

the one or more such images providing ultraviolet absorption contrast; and a modified reflective microscope objective lens integrated as the achromatic focusing element, in which the modified reflective microscope objective lens comprises:
- a primary reflective curved mirror surface configured to focus light with diffraction-limited performance without chromatic aberrations and that comprises a through-hole; and
- a curved reflective or partially reflective secondary mirror surface that has a material that one or more of:
  - permits reflection of a first set of wavelengths;
  - permits transmission of a secondary set of wavelengths; or
  - comprises a through-hole; and
- in which the modified reflective objective lens is configured to accept collimated or diverging light through the through-hole in the primary reflective curved mirror surface, reflect from the curved reflective or partially reflective secondary mirror surface, and then reflect from the primary reflective curved mirror surface and focus light with diffraction-limited performance without chromatic aberrations; and
- the through-hole in the curved reflective or partially reflective secondary mirror surface such that it defines a radius no larger than a radius at which light from the curved reflective or partially reflective secondary mirror surface is reflected onto the primary reflective curved mirror surface.

15. The fast-scanning multi-wavelength microscope system of claim 14 in which the structured ultraviolet-compatible fiber is configured to support a single mode close to a TEM00 mode at a multiplicity of the wavelengths of the fast scanning multi-wavelength microscope system and comprises one or more of:
- an endlessly single-mode fiber;
- a hollow-core fiber;
- fused silica materials;
- a single-mode fiber; or
- a photonic crystal fiberor.

16. The fast-scanning multi-wavelength microscope system of claim 14 comprising refocusing optics configured to refocus scattered or emitted light from the sample back into an structured ultraviolet-compatible fiber that maintains substantially single-mode operation at the scattered or emitted light wavelengths for confocal operation over multiple wavelengths.

17. A modified reflective microscope objective lens comprising:
- a primary reflective curved mirror surface configured to focus light with diffraction-limited performance without chromatic aberrations and that comprises a through-hole; and
- a curved reflective or partially reflective secondary mirror surface that has a material that one or more of:
  - permits reflection of a first set of wavelengths;
  - permits transmission of a secondary set of wavelengths; or
  - comprises a through-hole; and
- in which the modified reflective objective lens is configured to accept collimated or diverging light through the through-hole in the primary reflective curved mirror surface, reflect from the curved reflective or partially reflective secondary mirror surface, and then reflect from the primary reflective curved mirror surface and focus light with diffraction-limited performance without chromatic aberrations; and
- the through-hole in the curved reflective or partially reflective secondary mirror surface such that it defines a radius no larger than a radius at which light from the curved reflective or partially reflective secondary mirror surface is reflected onto the primary reflective curved mirror surface.

18. The modified reflective microscope objective lens of claim 17 further comprising one or more of:
- an optical focusing element;
- a transmissive element;
- a dichroic mirror; or
- a filter.

* * * * *